US006292135B1

(12) United States Patent
Takatori et al.

(10) Patent No.: US 6,292,135 B1
(45) Date of Patent: Sep. 18, 2001

(54) ADAPTIVE ARRAY ANTENNA SYSTEM

(75) Inventors: Yasushi Takatori; Keizo Cho; Kentaro Nishimori; Toshikazu Hori, all of Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/542,877

(22) Filed: Apr. 4, 2000

(30) Foreign Application Priority Data

Apr. 5, 1999 (JP) .......................... 11-097695
Aug. 2, 1999 (JP) .......................... 11-219056

(51) Int. Cl.[7] .......................... G01S 3/16; G01S 3/28
(52) U.S. Cl. .......................... 342/383; 342/378
(58) Field of Search .......................... 342/374, 375, 342/378, 383

(56) References Cited

U.S. PATENT DOCUMENTS

| | | | | |
|---|---|---|---|---|
| 5,218,359 | * | 6/1993 | Minamisono | 342/383 |
| 5,493,307 | * | 2/1996 | Tsujimoto | 342/380 |
| 5,982,327 | * | 11/1999 | Vook et al. | 342/380 |
| 6,107,963 | * | 8/2000 | Ohmi et al. | 342/383 |

FOREIGN PATENT DOCUMENTS 9-260940 10/1997 (JP) .
10-145130 5/1998 (JP) .

OTHER PUBLICATIONS

"Dual Diversity Combining and Equalization in Digital Cellular Mobile Radio", *IEEE Transactions on Vehicular Technology*, vol. 40, No. 2, May 1991, pp. 342–354.

* cited by examiner

*Primary Examiner*—Dao Phan
(74) *Attorney, Agent, or Firm*—Arent Fox Kintner Plotkin & Kahn, PLLC

(57) ABSTRACT

An adaptive array antenna system for stable directivity control and waveform equalization even under poor multipath environment is provided. An output of antenna elements (A1011–A101n) is weight combined (A103), and is output through automatic frequency control (A106) and fractionally spaced adaptive transversal filter (A107) which have real number weights. Weight combination (A103) is initially carried out with weights for an eigen vector beam for the maximum eigen vector of the correlation matrix $R_{xx}$ of a receive signal After carrier synchronization and timing synchronization between a receive signal, and an A/D converter and a fractionally spaced transversal filter are established by the automatic frequency control and the fractionally spaced transversal filter, the weight in the weight combiner (A103) is switched to minimum mean square error (MMSE) weight. Sampling rate for A/D conversion under an eigen vector beam forming is higher than twice of that of transmission rate, with asynchronous timing to a receive signal.

15 Claims, 29 Drawing Sheets

ADAPTIVE ARRAY ANTENNA SYSTEM

BACKGROUND OF THE INVENTION

The present invention relates to an adaptive array antenna system in radio communication system for directivity control and waveform equalization.

An adaptive array antenna system controls directivity of an antenna system so that received waves which have high correlation with a desired signal are combined, and received waves which have low correlation with a desired signal are suppressed.

In an adaptive array antenna system, a directivity is controlled so that the square of an error between a receive signal and a reference signal is the minimum. If a directivity control of an adaptive array antenna system is ideally carried out, transmission quality is highly improved even under multi-path environment such as out of line-of-sight.

For comparison between a receive signal and a reference signal, synchronization of a receive signal must first be established. If synchronization is unstable, the operation of an adaptive array antenna itself becomes unstable. Therefore, the stable operation of synchronization is essential under severe environment with degraded transmission quality.

A prior adaptive array antenna system is shown in FIG. 34. This is for instance shown in R. A. Monzingo and T. W. Miller, Introduction to Adaptive Arrays, John Wiley & Sons, Inc. 1980.

An adaptive array antenna system comprises N number of antenna elements A511 through A51N, N number of complex weight means A521 through A52N for giving a weight to an output of each antenna element, a weight control A53 for control a weight of said complex weight means, a reference signal generator A54, and a combiner A55 for combining weighted signals.

A value of weight ($W_{opt}$) for forming directivity so that the square of error between a desired signal and a receive signal is the minimum, is expressed in the equation (1), where signals received in N number of antennas are x1 through xN, weights in weight means A521 through A52N are w1 through wN, and d is a desired signal.

$$w_{opt}=R_{xx}^{-1}r_{xd} \quad (1)$$

where $$R_{xx}=E(x^*x_T) \quad (2)$$

$$r_{xd}=\begin{pmatrix} \overline{x1\ d^*} \\ | \\ | \\ | \\ | \\ | \\ \overline{xn\ d^*} \end{pmatrix} \quad (3)$$

-continued $$x=\begin{pmatrix} x1 \\ | \\ | \\ | \\ | \\ | \\ xN \end{pmatrix} \quad W_{opt}=\begin{pmatrix} w1 \\ | \\ | \\ | \\ | \\ | \\ wN \end{pmatrix} \quad (4)$$

In equations (2) and (3), $R_x$ is correlation matrix between antenna elements, E(P) is expected value of (P). The symbols x* and d* are conjugate of x and d, respectively. $x^T$ is transposed matrix of matrix x in the equation (4), and $R_{xx}^{-1}$ is inverse matrix of $R_{xx}$. The equation (2) shows that the correlation matrix $R_{xx}$ between antenna elements is a product of a conjugate of a matrix x and a transposed matrix $x^T$ of a matrix x. In the equation (3), the value $r_{xd}$ is a matix of average of a product of a receive signal x1 through xN received by each antenna elements, and a conjugate of a desired signal component d.

In an adaptive array antenna system, a directivity is controlled so that an error between an output signal and a desired signal is the minimum. Therefore, the error is not the minimum until the directivity converges, and in particular, the error is large during the initial stage of the directivity control. when the error in the initial stage is large, carrier synchronization and timing synchronization are unstable, so that a frequency error and a timing error from a desired signal can not be detected. Thus, the value $r_{xd}$ might have large error, and an adaptive array antenna system does not operate correctly.

FIG. 35 shows a block diagram of a prior adaptive array antenna system having N number of antenna elements, and forming a directivity beam before synchronization is established. This is described in "Experiment for Interference Suppression in a BSCMA Adaptive Array Antenna", by Tanaka, Miura, and Karasawa, Technical Journal of Institute of Electronics, Information and Communication in Japan, Vol. 95, No. 535, pages 49–54, Feb. 26, 1996.

In the figure, the symbols A611 through A61N are a plurality of antenna elements, A621 through A62N are A/D converters each coupled with respective antenna element, A63 is an FFT (Fast Fourier Transform) multibeam forming means for forming a plurality of beams through FFT process by using outputs of the A/D converters A621 through A62N, A64 is a beam selection means for selecting a beam which is subject to weighting among the beams thus formed, and A65 is an adaptive beam control means for controlling a selected beam. The beam selection means A64 selects a beam which exceed a predetermined threshold, then, a directivity of an antenna is directed to a direction of a receive signal having high power. Thus, synchronization characteristcs are improved.

However, when signal quality is degraded because of long delay longer than one symbol length, and/or interference, no correlation is recognized between signal quality and receive level. In that environment, the prior art which forms a plurality of beams through FFT process, and selects a beam which exceeds a threshold, is not practical.

Further, the prior art which forms a plurality of beams through FFT process, and selects a beam which exceeds a threshold, needs much amount of calculation for measuring signal quality. Further, it has the disadvantage that an adaptive array antenna does not operate correctly because of out of synchronization in an indoor environment which generates many multi-paths.

Next, a prior art for establishing synchronization is described.

FIG. 36 shows a block diagram of a prior adaptive array antenna which uses a transversal filter. This is described in "Dual Diversity and Equalization in Digital Cellular Mobile Radio", Transaction on VEHICULAR TECHNOLOGY, VOL. 40, No. 2, May 1991.

In the figure, the numerals 14011 through 1401N are antenna elements, 1402 is a beam forming circuit, 14031 through 1403N are first weight means, 1404 is a first combiner, 1405 is a transversal filter, 14061 through 1406M are delay elements, 14070 through 1407M are second weight means, 1408 is a second combiner, 1412 is an automatic frequency control, 1413 is a timing regeneration circuit, 14141 through 1414N are A/D (analog to digital) converters.

FIG. 37 shows a detailed block diagram of first weight means 14031 through 1403N, and second weight means 14070 through 1407M. In the figure, 14091 through 14094 are multipliers for real values, 1410 is a subtractor for real values, and 1411 is an adder for real values. 1415 is a clock generator.

The timing regeneration circuit 1413 regenerates a clock signal which is the same as that of a receive signal. The A/D converters 14141 through 1414N carry out the A/D conversion of a receive signal by using the regenerated clock signal, and the converted signal is applied to the beam forming circuit 1402.

Assuming that an output signal of the beam forming circuit 1402 is $y_b(t)$, the weights cO through cM of the second weight means 10470 through 1047M are determined so that the following equation is satisfied.

$$C=R_t^{-1}r_{txd} \quad (5)$$

where $R_t$ is matrix having (M+1) columns and (M+1) lines, having an element on i'th line and j'th column;

$$E[y_b(t-(i-1)(T_S/a)y_b(t-(j-1)(T_S/a)^*] \quad (6)$$

and $r_{txd}$ is a vector of (M+1) dimensions, having i'th element;

$$E[y_b(t-(i-1)(T_S/a)d(t)^*]$$

where Ts is symbol length of a digital signal, and (a) is an integer larger than 2.

In the above prior art, a signal at each antenna elements is essential, and therefore, a receive signal at an antenna element is converted to digital form by using an A/D converter. However, if sampling rate in A/D conversion differs from receive signal rate, the algorithm of minumum mean square error can not be used at a beam forming network, since a beam forming circuit would be controlled by a data with no timing compensation.

Further, the prior art has the disadvantage that the operation is unstable, since waveform equalization is carried out in both a transversal filter and a beam forming circuit. Further, as the second weight means operates with complex values, the hardware structure is complicated.

Accordingly, it should be appreciated that the transmission quality would considerably be degraded and timing synchronization would be degraded, because of long delay longer than one symbol period in a digital radio circuit.

When timing synchronization is degraded in a prior art, a minimum mean square error algorithm can not be used, and an adaptive array antenna does not operate correctly.

SUMMARY OF THE INVENTION

An object of the present invention is to provide a novel and improved adaptive array antenna system by overcoming disadvantages of a prior adaptive array antenna system.

It is also an object of the present invention to provide an adaptive array antenna system which provides stable directivity control and waveform equalization even under severe environment with poor transmission quality such as multipath environment.

The first feature of the present invention is to provide a directivity control by using an eigen vector beam for the maximum eigen vector of a correlation matrix of antenna elements until synchronization is established, so that transmission quality is improved and synchronization is established. When synchronization is established, the directivity control is carried out to minimum mean square error control method.

The second feature of the present invention is that timing for an A/D converter for synchronization is asynchronous to a receive signal.

The third feature of the present invention is that a transversal filter for synchronization operates with real number weights.

The present adaptive array antenna system comprises;

a plurality of antenna elements, a weight combiner coupled with said antenna elements for providing weight to signals of said antenna elements, and combining weighted signals, a weight control coupled with said antenna elements for calculating weights for said weight combiner, an automatic frequency control accepting an output of said weight combiner, a fractionally spaced adaptive transversal filter for accepting an output of said automatic frequency control, a synchronization monitor accepting an output of said automatic frequency control and weights of said transversal filter, said weight control comprises;

an eigen vector beam forming means for obtaining correlation matrix among said antenna elements and providing weights of eigen vector relating to the maximum eigen values of said correlation matrix, a minimum mean square error means for providing weights so that a square error between output of said weight control and a desired signal is the minimum, and a switch for selecting one of said eigen vector beam forming means and said minimum mean square error means, wherein;

weights in said weight combiner for said antenna elements are initially determined by said eigen vector beam forming means so that eigen vector beam is formed, and then, determined by said minimum mean square error means after said synchronization monitor recognizes that automatic frequency control and said adaptive transversal filter have converged.

Preferably, an adaptive array antenna system according to the present invention comprises;

a plurality of antenna elements, an analog beam former coupled with said antenna elements for weighting signals of said antenna elements with first weight means, a first A/D converter coupled with an output of said analog beam former for converting said output signal into digital form, a first frequency converter for converting an output signal of said A/D converter to a baseband signal, a first fractionally spaced transversal filter coupled with an output of said first frequency converter, and having a plurality of series connected delay elements each having fractional symbol delay, second weight means for weighting an output of each delay elements, and a combiner for combining outputs of said weight means, a first weight control for providing weights to said first weight means, said first weight control receiving a receive signal of said antenna elements and/or an output of said first transversal filter, having a second A/D converter for converting a receive signal into digital form, and a first digital signal processor coupled with an output of said second A/D converter and providing weights to said first weight means, a second weight control receiving an output of said first frequency converter and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, a second sampling clock generator for generating sampling clock of said second A/D converter, said first sampling clock being higher than twice of frequency of transmission rate of receive signal, being asynchronous to said receive signal, and having essentially the same period as delay time of each delay elements of said first transversal filter, and said second sampling clock being asynchronous to said first sampling clock.

Preferably, said first weight control comprises a second frequency converter, which converts a receive signal of said antenna elements to IF frequency.

Preferably, an adaptive array antenna system according to the present invention comprises; a second frequency converter for converting a receive signal to IF frequency or a third frequency converter for converting a receive signal to baseband signal, and said IF frequency or said baseband signal thus converted is applied to said first weight control.

Preferably, an adaptive array antenna system according to the present invention comprises;

a plurality of antenna elements, an analog beam former coupled with said antenna elements for weighting signals of said antenna elements with first weight means, a first frequency converter coupled with an output of said analog beam former for converting said output signal into digital form, a first frequency converter for converting an output signal of said A/D converter to a baseband signal, a first fractionally spaced transversal filter coupled with an output of said first frequency converter, and having a plurality of series connected delay elements each having fractional symbol delay, second weight means for weighting an output of each delay elements, and a combiner for combining outputs of said weight means, a first weight control for providing weights to said first weight means, said first weight control receiving a receive signal of said antenna elements and/or an output of said first transversal filter, having a second A/D converter for converting a receive signal into digital form, and a first digital signal processor coupled with an output of said second A/D converter and providing weights to said first weight means, a second weight control receiving an output of said first frequency converter and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, a second sampling clock generator for generating sampling clock of said second A/D converter, said first sampling clock being higher than twice of frequency of transmission rate of receive signal, being asynchronous to said receive signal, and having essentially the same period as delay time of each delay elements of said first transversal filter, and said second sampling clock being asynchronous to said first sampling clock.

Preferably, an adaptive array antenna system according to the present invention comprises;

a plurality of antenna elements, a first A/D converter coupled with said antenna elements for converting a receive signal of said antenna elements into digital form, a digital beam former coupled with output of said first A/D converter for weighting signals with first weight means, a first frequency converter coupled with an output of said digital beam former for converting said output signal into baseband signal, a first A/D converter for converting an output signal of said frequency converter into digital form, a first fractionally spaced transversal filter coupled with an output of said first frequency converter, and having a plurality of series connected delay elements each having fractional symbol dealy, second weight means for weighting an output of each delay elements, and a combiner for combining outputs of said weight means, a first weight control for providing weights to said first weight means, said first weight control receiving an output of said first A/D converter and/or an output of said first transversal filter, having a first digital signal processor providing weights to said first weight means, a second weight control receiving an output of said first frequency converter and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, said first sampling clock being higher than twice of frequency of transmission rate of receive signal, being asynchronous to said receive signal, and having essentially the same period as delay time of each delay elements of said first transversal filter.

Preferably, said adaptive array antenna system comprises a second frequency converter coupled with said antenna elements for converting a receive signal to IF signal, or a third frequency converter for converting said receive signal into baseband signal, so that said IF signal or said baseband signal is applied to said first A/D converter.

Preferably, an adaptive array antenna system according to the present invention comprises;

a plurality of antenna elements, a first frequency converter coupled with said antenna elements for converting a receive signal of said antenna elements to baseband signal, a first A/D converter coupled with an output of said first frequency converter for converting said output into digital form, a digital beam former coupled with an output of said first A/D converter for weighting signals with first weight means and combining weighted signals, a first fractionaly spaced transversal filter coupled with an output of said digital beam former, and having a plurality of series connected delay elements each having fractional symbol delay, second weight means for weighting an output of each delay elements, and a combiner for combining outputs of said weight means, a first weight control for providing weights to said first weight means, said first weight control receiving an output of said first A/D converter and/or an output of said first transversal filter, having a first digital signal processor providing weights to said first weight means, a second weight control receiving an output of said digital beam former and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, said first sampling clock being higher than twice of frequency of transmission rate of receive signal, being asynchronous to said receive signal, and having essentially the same period as delay time of each delay elements of said first transversal filter.

Preferably, said second weight control comprises an environment measure to determine whether transmission path is under frequency selective fading environment or not, and second weight in said first transversal filter is selected to be real number or complex number depending upon whether transmission path is under frequency selective fading environment or not.

Preferably, in an adaptive array antenna system according to the present invention;

said receive signal is modulated with modulation system which provides discrete amplitude at decision point of each symbol, said second weight control comprises;

a memory storing a set of optimum second weights which relate to error between sample timing in said first A/D converter and optimum timing for decoding, a transmission quality estimate for estimating an error of an output of said first transversal filter from said discrete amplitude when sampled with said second weights stored in said memory, and a second weights being selected from content of said memory so that an estimated error by said transmission quality estimate is the minimum.

Preferably, in an adaptive array antenna system according to the present invention, said first digital signal processor comprises;

a reference signal generator providing a reference signal (d), a fourth frequency converter for converting a receive signal of said antenna elements with the same characteristics as that of said first frequency converter, a second transversal filter for converting an output of said fourth frequency converter with the same characteristics as that of said first transversal filter, and said first weight $W_{opt}(i)$ (i=1, - - - ,N) is determined with following equations for signal x'(i) (i=1, - - - , N,N is a number of elements) converted by said fourth frequency converter and said second transversal filter;

$$W_{opt}=R_{xx}^{-1}r_{xd} \quad (A)$$

where $$R_{xx}=E(x^*x^T) \quad (B)$$

$$r_{xd}=\begin{pmatrix} \overline{x1\ d^*} \\ | \\ | \\ | \\ | \\ | \\ \overline{xn\ d^*} \end{pmatrix} \quad (C)$$

$$x=\begin{pmatrix} x1 \\ | \\ | \\ | \\ | \\ | \\ xN \end{pmatrix} \quad W_{opt}=\begin{pmatrix} w1 \\ | \\ | \\ | \\ | \\ | \\ wN \end{pmatrix} \quad (D)$$

Still preferably, in an adaptive array antenna system according to the present invention said first digital signal processor comprises;

a reference signal generator for generating a reference signal d, fourth frequency converter for frequency conversion of a receive signal of antenna elements with the same characteristics as that of said third frequency converter, second transversal filter for conversion of an output of said fourth frequency converter with the same characteristics of said first transversal filter, wherein;

first weight $W_{opt}(i)$ (i=1, - - - ,N) is determined by the following equations for a signal x'(i) converted by said fourth frequency converter and said second transversal filter;

$$W_{opt}=R'_{xx}{}^{-1}{}_{xd} \quad (A)$$

where;

$$R'_{xx}=E[x'^*x'^T] \quad (B)$$

$$r_{xd}=\begin{pmatrix} \overline{x1\ d^*} \\ | \\ | \\ | \\ | \\ | \\ \overline{xn\ d^*} \end{pmatrix} \quad (C)$$

-continued $$x=\begin{pmatrix} x1 \\ | \\ | \\ | \\ | \\ | \\ xN \end{pmatrix} \quad W_{opt}=\begin{pmatrix} w1 \\ | \\ | \\ | \\ | \\ | \\ wN \end{pmatrix} \tag{D}$$

Still preferably, an adaptive array antenna system according to the present invention comprises;

a plurality of antenna elements, an analog beam former coupled with said antenna elements for weighting each signals of said antenna elements by using weight means and combining weighted signals, a plurality of first quasi coherent detectors receiving signals of said antenna elements and an output of said analog beam former, and providing two outputs, a number of said first quasi coherent detectors being the same as a number of said antenna elements, a first A/D converter for converting outputs of said quasi coherent detectors into digital form, a digital signal processor receiving an output of said first A/D converter and providing weights in said analog beam former, sampling clock frequency $f_s$ of said first A/D converter being determined to be;

$$f_s=1/((T/2)+m)$$

where symbol rate of transmission signal is 1/T (Hz), and m is an integer larger than 0, said digital signal processor providing;

a first correlation matrix among antenna elements from 2n'th signal (n is an integer) of outputs of said first A/D converter, a second correlation matrix among antenna elements from (2n+1)'th signal, a third correlation matrix which is sum of said first correlation matrix and said second correlation matrix, and an element of an eigen vector for the maximum eigen value of said third correlation matrix among antenna elements being determined as a weight of said weight means.

BRIEF DESCRIPTION OF THE DRAWINGS

The foregoing and other objects, features, and attendant advantages of the present invention will be appreciated as the same become better understood by means of the following description and the accompanying drawings wherein.

DESCRIPTION OF THE PREFERRED EMBODIMENTS

Figure 1:
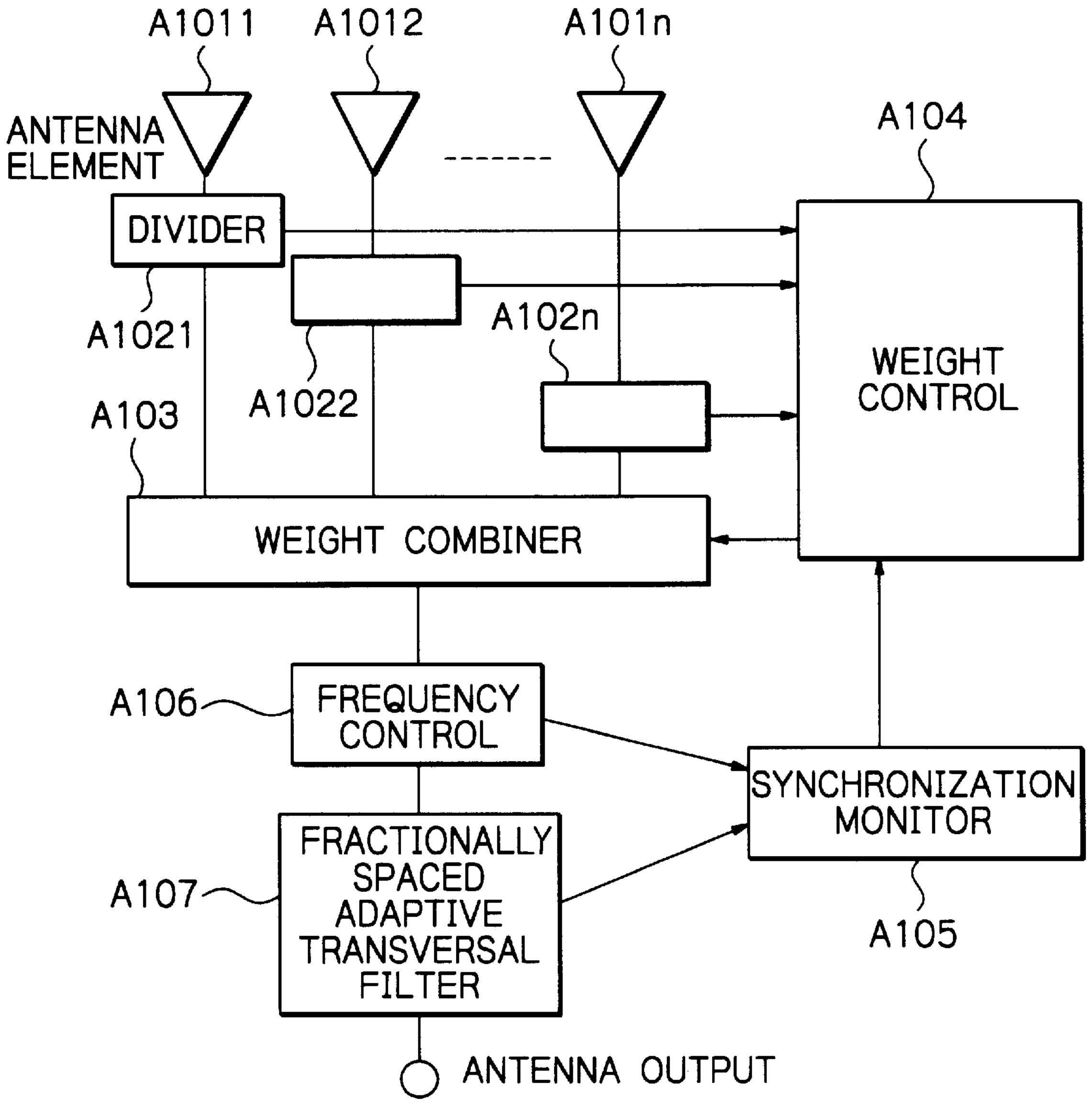
FIG. 1 is a block diagram of an embodiment of the present invention.

FIG. 1 is a block diagram of an adaptive array antenna system according to the present invention, in which an array antenna having n number of antenna elements is used. A directivity of the antenna system in FIG. 1 is initially controlled by assigning an eigen vector beam for the maximum eigen vector of a correlation matrix of receive signal so that fair transmission quality is obtained before synchronization is established, and then, after synchronization is established, directivity is controlled so that square error is the minimum.

In FIG. 1, the symbols A1011 through A101n are antenna elements, A1021 through A102n are divides each coupled with a respective antenna element, A103 is a weight combiner, A104 is a weight control, A105 is a synchronization monitor, A106 is an automatic frequency control, A107 is a fractionally spaced transversal filter. Input signals from divides A1021 through A102n into a weight control A104 are designated as x1 through xN.

Figure 2:
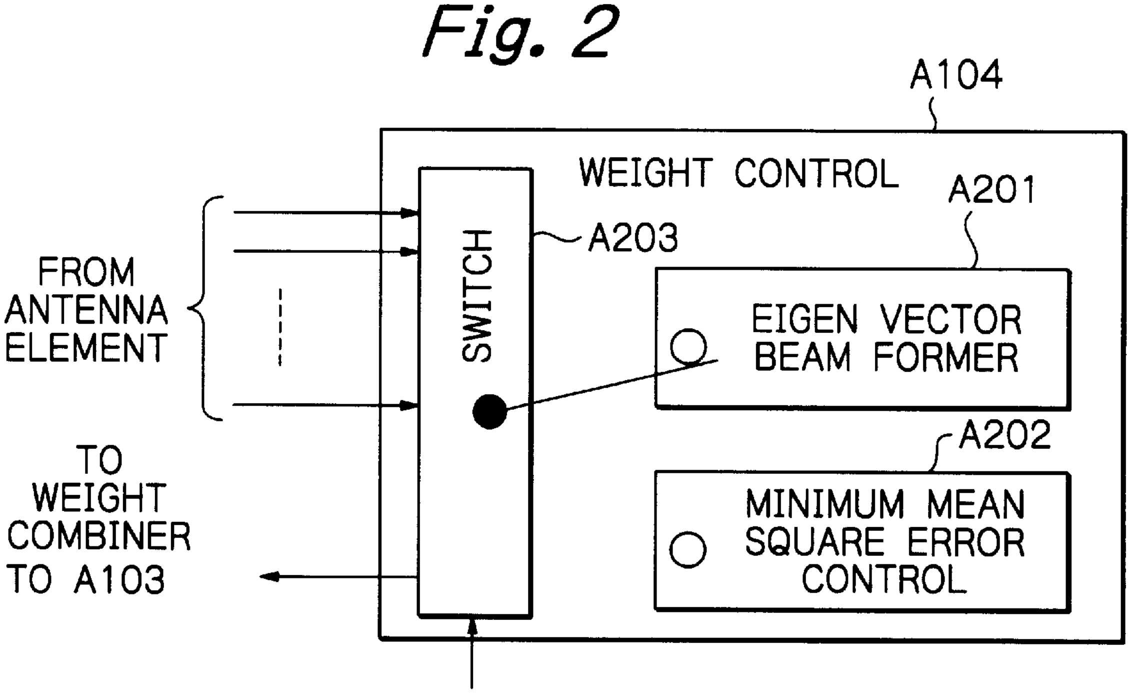
FIG. 2 is a block diagram of a weight control A104 in FIG. 1.

FIG. 2 is a block diagram of a weight control A104, in which A201 is an eigen vector forming means, A202 is a minimum mean square error (MMSE) means, and A203 is a switch.

Figure 3:
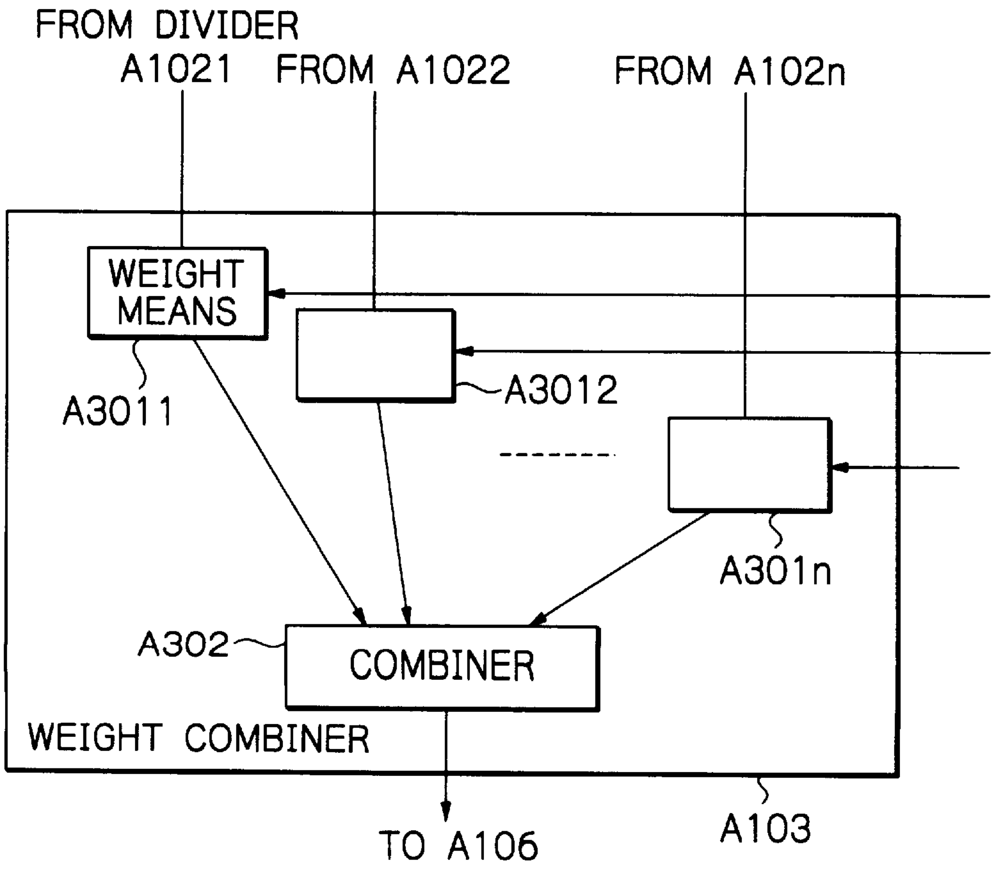
FIG. 3 is a block diagram of a weight combiner A103 in FIG. 1.

FIG. 3 is a block diagram of a weight combiner A103, in which A3011 through A301n are weight means, and A302 is a combiner. It is assumed that values of weight provided by the weight devices A3011 through A301n are wl through wN, respectively.

Figure 4:
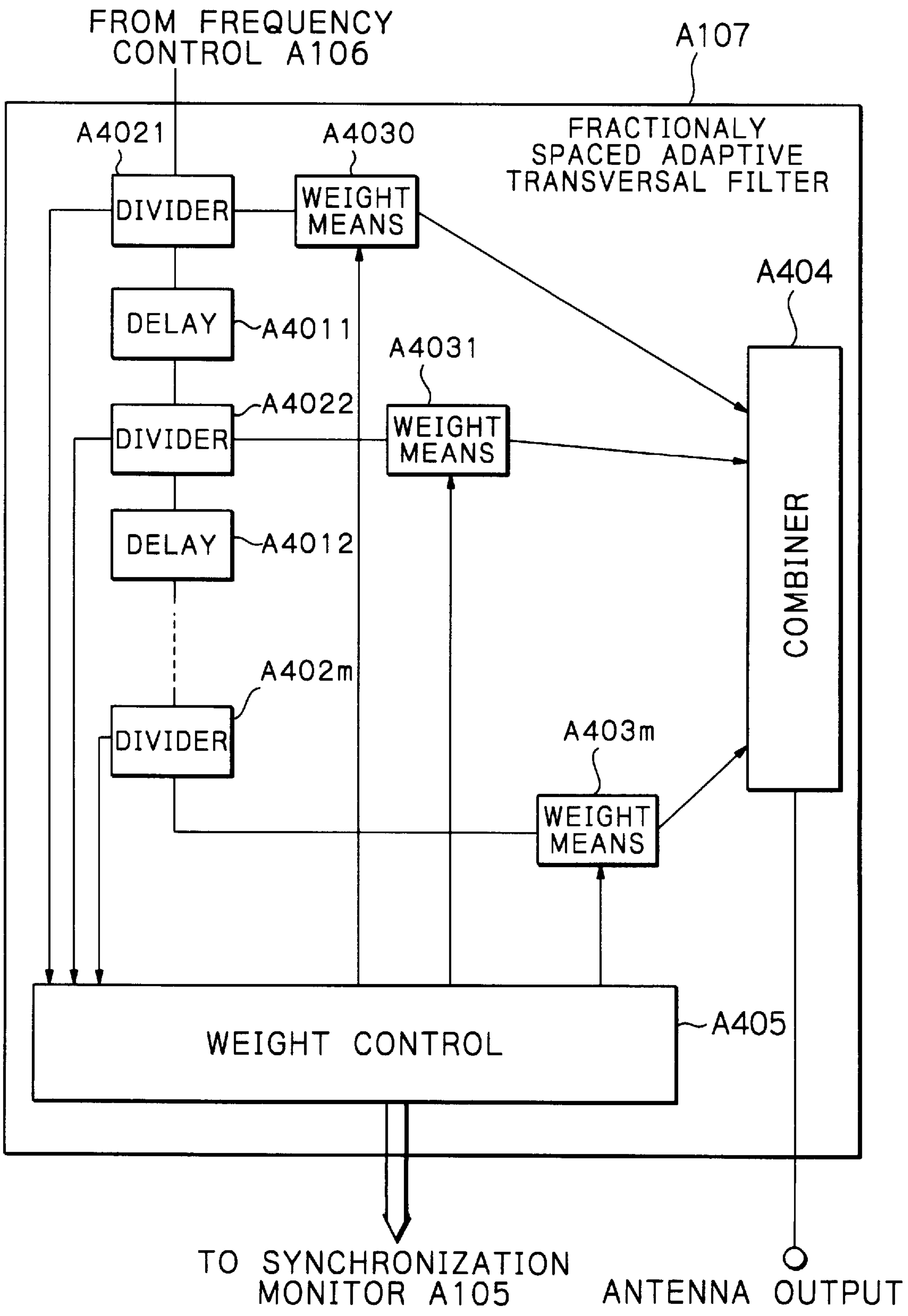
FIG. 4 is a block diagram of a fractionaly spaced adaptive transversal filter A107 in FIG. 1.

FIG. 4 is a block diagram of a fractionally spaced adaptive transversal filter, in which A4011 through A401n are delay means for generating fractional delay, A4021 through A402m are divider, A4030 through A403m are weight means, A404 is a combiner, and A405 is a weight control.

In an initial phase, the switch A203 in the weight control A104 selects the eigen vector beam forming menas A201, which forms correlation matrix $R_{xx}$ according to input signals x1 through xN. Next, the eigen vector of the maximum eigen value in the correlation matrix $R_{xx}$ is calculated through, for instance, a power series method. In the power series method, an vector (a) which is arbitrary (for instance, (a)=(1, 0, 0, 0) in case of four antenna elements) is multiplied to a correlation matrix $R_{xx}$ to provide;

$$a'=(R_{xx}^{k})\times(a)$$

That process is repeated by k times. If the value k which is a number of repetition is large enough (for instance k>=5), a' is almost the same as the eigen vector for the maximum eigen value. Then, the weights wl through wN are determined by normalized value of a'. The weight combiner A103 forms the eigen vector beam.

An output of the weight combiner A103 is applied to the automatic frequency control A106 for carrier synchronization. An output of the automatic frequency control A106 is applied to the fractionaly spaced adaptive transversal filter A107 for timing synchronization. The operation of the automatic frequency control A106 and the fractionaly spaced adaptive transversal filter A107 is monitored by the synchronization monitor A107. When the operation converges, the switch A203 in the weight control selects the minimum mean square error (MMSE) means.

The minimum mean square error means forms, first, a correlation matrix $R_{xx}$ according to input signals x1 through xN, then, provides a correlation value $r_{xd}$ between signals of each antenna elements A1011 through A101n and a desired signal d. The weights wl through wN are obtained by using $R_{xx}$ and $r_{xd}$ according to the equation (1). The weight combiner A103 forms an optimum directivity by using the weights w1 through wN.

Now, the operation of the adaptive array antenna system according to the present invention is described.

When carrier synchronization is out of phase, it is assumed that frequency error is Δf. Actual receive signals x1 through xN are expressed as follows where receive signals with no frequency error (Δf=0) are x10 through xN0.

$$x_i=x_{i0}\exp(j2¶\Delta ft),\ i=1,\ ---\ ,N\ t;\text{time} \quad (7)$$

The correlation between an antenna element i and an antenna element k is;

$$r_{ik}=x_ix_k^*=x_{i0}\exp(j2¶\Delta ft)x_{k0}^*\exp(-j2¶\Delta ft)=x_{i0}x_{k0}^* \quad (8)$$

It should be noted that $r_{ik}$ is independent from Δf. Thus, it should be appreciated that the correlation matrix $R_{xx}$ among antenna elements is not affected by carrier synchronization.

Next, the change of the correlation matrix $R_{xx}$ when timing synchronization is out of phase is analyzed.

Figure 5:
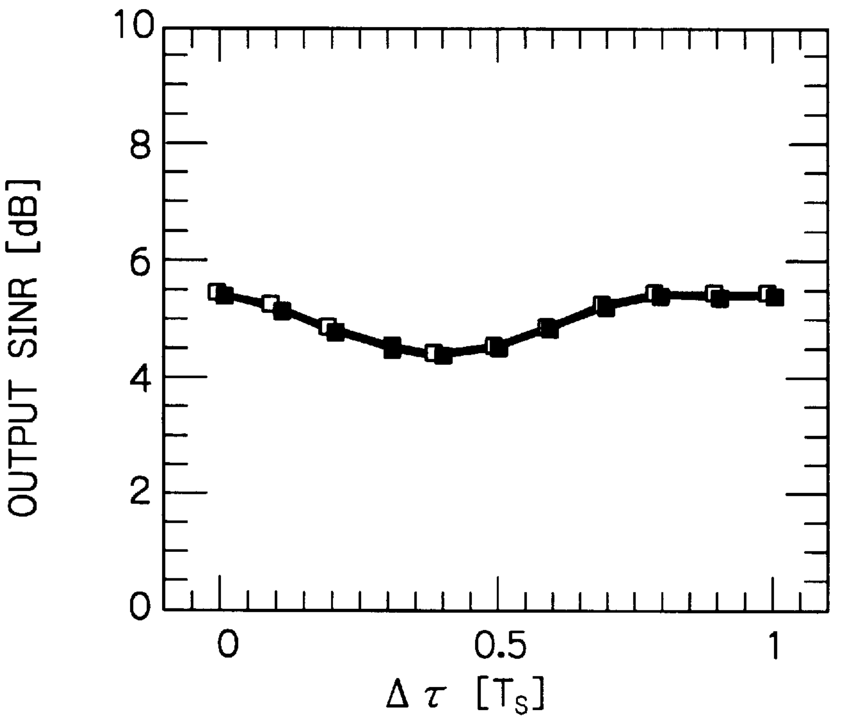
FIG. 5 shows a curve which shows that a timing synchronization is not affected by correlation matrix among antenna elements.

FIG. 5 shows the result of computer simulation through geometrical optics method when an adaptive array antenna is used at a base station. In the figure, the horizontal axis shows symbol length Ts. The simulation conditions are as follows.

The size of a chamber is 20 m(vertical)×20 m(horizontal)×3 m(height). A subscriber terminal is positioned at 8 m(vertical), 12 m(horizontal) and 0.9 m(height), and a base station is positioned at 0.1 m(vertical), 0.1 m(horizontal), and 2.9 m(height). An adaptive array antenna in a base station is a linear array antenna with four elements, having broadside direction in diagonal of the chamber. The directivity in vertical plane of a base station antenna and a subscriber terminal antenna is 60° in half level angle, and the directivity in horizontal plane is 90° in half level angle (base station), and 120° in half level angle (subscriber terminal). The tilt angle is 0° in both stations. The vertical polarization wave is used. The material of the walls of the chamber is metal, and the material of the floor and the ceiling is concrete. The maximum number of reflections is 30 times on walls, and 3 times on the ceiling and the floor.

As shown in FIG. 5, it should be noted that the correlation among each antenna elements does not depend upon timing error Δτ.

From the above results, the eigen vector formed by the correlation values among antenna elements does not almost change even when carrier synchronization and timing synchronization are out of phase.

Accordingly, signals received in the antenna elements are sampled with the rate higher than twice of transmission rate. Then, the eigen vector of the correlation matrix among antenna elements are obtained by using sampled signals, and the eigen vector beam is formed as weights of the eigen vector. As the eigen vector beam is obtained from the correlation matrix, it is independent from carrier synchronization and timing synchronization.

Then, an output of the eigen vector beam is applied to the automatic frequency control, an output of which is applied to the adaptive transversal filter with over sampling (each symbol is sampled a plurality of times) for timing synchronization.

Further, a transfer function of the adaptive transversal filter when timing synchronization is inphse is obtained. The weight control calculates convolution of the transfer function of the transversal filter and the received signals of the antenna elements, and then, minimum mean square error control (MMSE) is carried out to the convolution result so that the optimum directivity pattern is provided.

Figure 6:
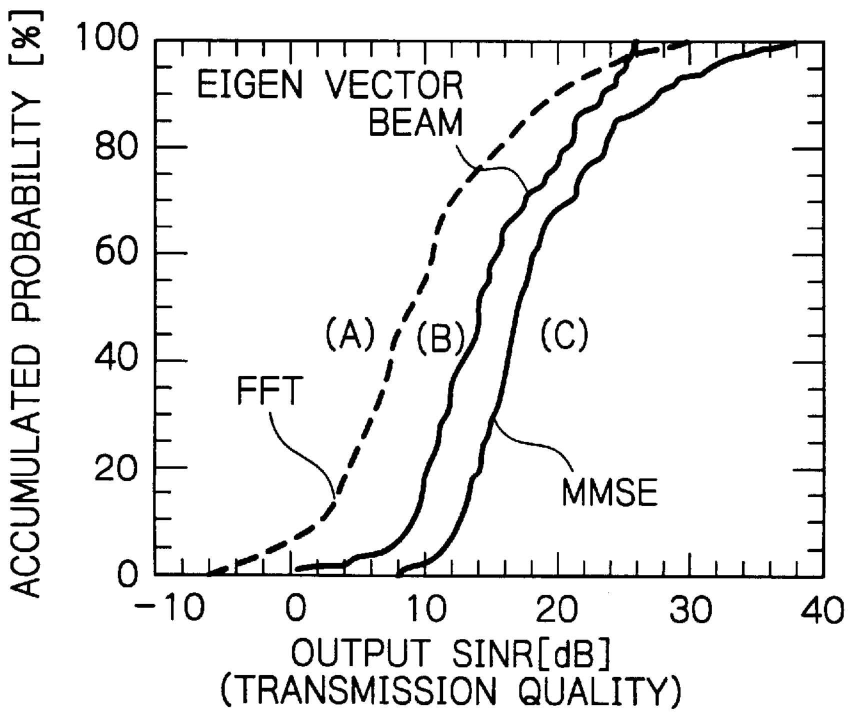
FIG. 6 shows curves of the effect of the present invention.

FIG. 6 shows accumulative probability of the final output of the present invention (curve (C)), the characteristic of the eigen vector (curve (B)), and a prior art (curve (A)) using a beam forming by FFT. In FIG. 6, the vertical axis shown accumulative probability (%) which shows the accumulative probability which is lower than the value of the horizontal axis.

It should be noted in the figure that according to the curve (A) which uses only FFT, the accumulative probability is higher than 20% for (SINR)<4 dB, where SINR is abbreviation of Output Signal to Interference plus Noise Ratio. This value is not enough for synchronization. In case of the curve (B) which uses the eigen vector beam, it is less than 3% for Output SINR<4 dB. Further, in case of the curve (C) in which minimum mean square error (MMSE) control is carried out after synchronization is established, it is higher than 90% for Output SINR>10 dB.

Now, the embodiments for establishing synchronization are described in accordance with FIGS. 7 through 30.

In those figures, the beam forming is carried out by the concept of FIGS. 1 and 2, that is to say, the eigen vector beam is first formed before synchronization, and is switched to MMSE beam upon synchronization.

Figure 7:
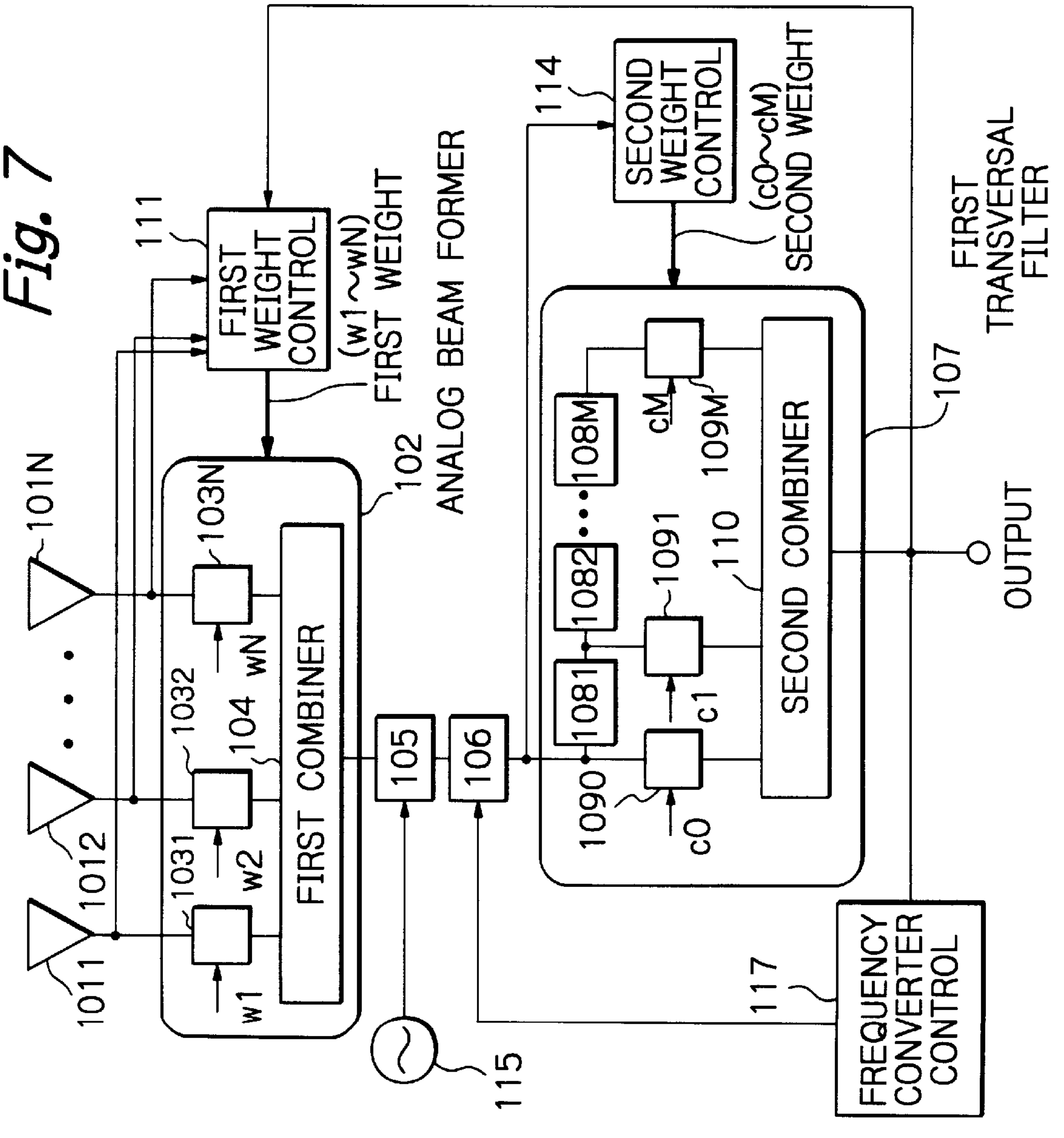
FIG. 7 is a block diagram of an embodiment of the present invention.

In the embodiment of FIG. 7, an array antenna has N number of antenna elements, a sampling in a first A/D converter and a second A/D converter is carried out asynchronously with a receive signal, and weight of a first transversal filter is real number.

In FIG. 7, the symbols 1011 through 101N are antenna elements, 102 is an analog beam former, 1031 through 103N are first weight means, 104 is a first combiner, 105 is a first A/D (analog to digital) converter, 106 is a first frequency converter, 107 is a first transversal filter, 1081 through 108N are delay elements, 1090 through 109M are second weight means, 110 is a second combiner, 111 is a first weight control, 114 is a second weight control, 115 is a first sampling clock generator, and 117 is a frequency converter control.

Figure 8:
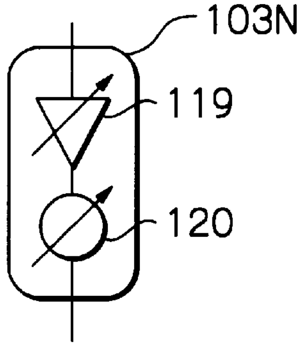
FIG. 8 shows a weight means 1031 through 103N in FIG. 7.

FIG. 8 is a block diagram of said first weight means 1031 through 103N, in which 119 is a variable gain amplifier, and 120 is a variable phase shifter.

Figure 9:
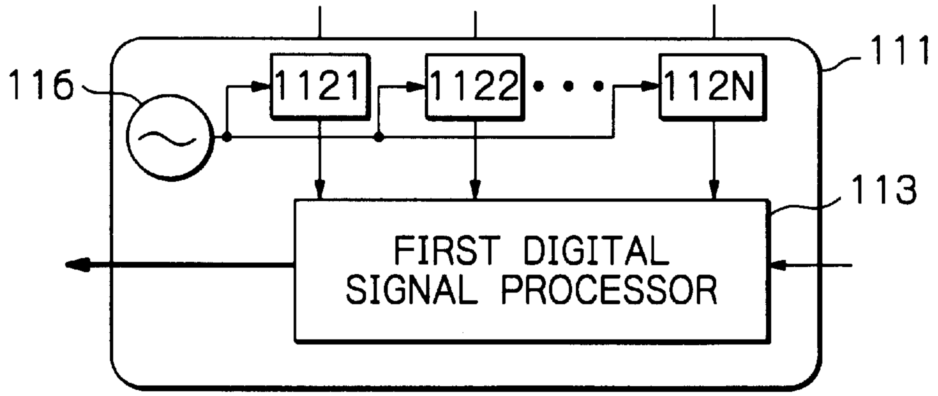
FIG. 9 is a first weight control 111 in FIG. 7.

FIG. 9 is a block diagram of said first weight control 111, in which 1121 through 112N are second A/D converters, 113 is a first digital signal processor, and 116 is a second sampling clock generator.

Figure 10:
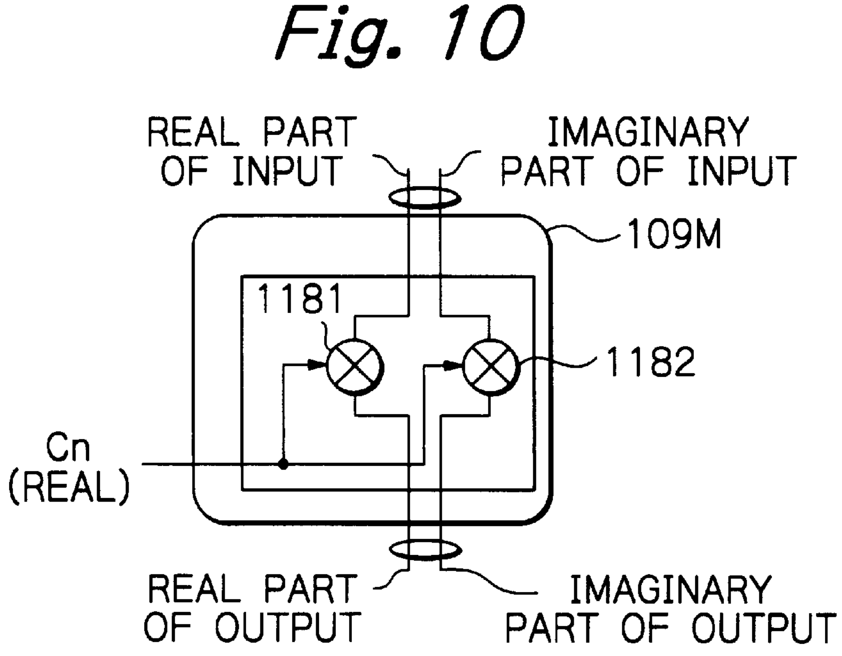
FIG. 10 is a second weight means 1090 through 109M in FIG. 7.

FIG. 10 is a block diagram of said second weight means 1090 through 109M, in which 1181 and 1182 are real multipliers.

In the above structure, receive signals x1 through xN received by antenna elements 1011 through 101N are applied to the analog beam former 102 and the first weight control 111. When the level of the received signals is low, a low noise amplifier is used for amplifying received signals before applying received signals to the analog beam former 102 and the first weight control 111. The analog beam former 102 provides the weights w1 through wN to each received signals, respectively, in the weight means 1031 through 103N so that amplitude and phase of the received signals are modified, and the weight signals w1x1, w2x2, - - - ,wNxN are provided. The modification of the amplitude and the phase is carried out by the series circuit of the variable gain amplifier 119 and the variable phase shifter 120, each controlled properly. The weighted signals are combined in the first combiner 104 which provides an output signal y as follows.

$$y=w1x1+w2x2+ \text{- - -} +wNxN$$

The combined signal y is applied to the first A/D converter 105 which converts an input signal to digital form. The signal y in digital form is divided into real part and imaginary part in the baseband signal in the first frequency converter 106. This is described in "Digital I/Q Detection Technique" in Technical Report of IEICE Sane 94-59 (1994-11) pages 9–15, by Shinonaga et al.

An output of the first frequency converter 106 is applied to the first transversal filter 107 and the second weight control 114. The former has delay elements 1081 through 108M each connected in serial and providing delay time Ts/a (Ts is symbol length of a digital signal, (a) is an integer larger than 2), so that M+1 number of delayed signals each delayed by mxTs/a (m=0, - - - ,M) are obtained.

Each delayed signals are weighted in the second weight means 1090 through 109M each providing the weights cO through cM, respectively. The weighted signals are added in the second combiner 110, and the combined signal is an output of the first transversal filter 107. The multiplication with real number is carried out in the real multipliers 1181 and 1182. The complex weighting is carried out as follows by using real multipliers.

Real part of real weighted output=(weight)x(real part of input signal)

Imaginary part of real weighted output=(weight)x(imaginary part of input signal)

An output (real part and imaginary part) of the first transversal filter 107) is an output of the present adaptive array antenna system.

The value of weights in the first weight means 1031 through 103N in the analog beam former 102 for providing directivity pattern is obtained in the first weight control 111 which uses only receive signals x1 through xN in the antenna elements 1011 through 101N, or both the receive signals x1 through xN and output signal of the first transversal filter 107.

In the first weight control 111, the receive signals in the antenna elements 1011 through 101N are converted to digital form by using the second A/D converters 1121 through 112N which use the second sampling clock generator 116. The second sampling clock by the second sampling clock generator 116 may be either the same as the first sampling clock or not.

For instance, when only x1 through xN are used, $$y'=w1x1+w2x2+ \text{- - -} +wNxN$$

are calculated, where wn=exp(jnθ), and the value wn for providing the maximum value of y' is determined.

The first weight control may determine the weights in other algorithm, for instance, CMA algorithm, MMSE algorithm, DCMP algorithm, and/or power inversion algorithm. Those are described in (1) "Adaptive signal process in an array antenna" by Kikuma, Japanese book published by Science Technology Publish Co., Sep. 20, 1998.

(2) R. A. Monzingo and T. W. Miller, "Introduction to Adaptive Arrays", John Wiley & Sons, Inc. 1980.

When an algorithm which converts receive signal x1 through xN to baseband signal, the first digital signal processor 113 carries out the same frequency conversion as that of the first frequency converter 106 so that real part and imaginary part of baseband signal are determined, and the algorithm is used for those parts.

The weights in the second weight means 1090 through 109M in the first transversal filter 107 are determined by the algorithm described in the following descriptions.

(1) R. W. Luck, "Automatic equalization for digital communication", Bell Syst. Tech. J., 44, 4, page 547 (1965).

(2) R. W. Luck, and H. R. Rudin, "An automatic equalizer for general purpose communication channels", Bell Syst. Tech. J., 46, 9, page 2179 (1967).

A prior adaptive array antenna using a transversal filter takes complex value for the second weights cO through cM for the purpose of waveform equalization. However, it does not operate when no timing synchronization is established.

Therefore, the present invention takes real value for the second weights c0 through cM in the first transversal filter 107, and the compensation for the timing synchronization is carried out simultaneously.

The reason why the timing synchronization is compensated when the second weights c0 through cM in the first transversal filter 107 are real numbers, is described as follows.

In QAM modulation system, assuming that $I_k$ and $Q_k$ are inphase component and quadrature component, respectively, of k'th signal, baseband signal s(t) is expressed as follows.

$$s(t)=\sum_{k=-\infty}^{\infty} h(t-kTs)(I_k+jQ_k) \tag{9}$$

where f is carrier frequency, h(t) is impulse response by a band restriction filter.

A band restriction filter is, in general, designed so that the following Nyquist condition is satisfied for an inpulse response h(t) so that no intersymbol interference occurs.

h(kTs)=0(k= - - - 2, 21, 1, 2, - - - )

where h(0)≠0, and t=kTs is called as discrimination timing.

If a sampling which is offset by Δτ from the discrimination timing, intersymbol interference is generated and transmission quality is degraded, since h(kTs+Δτ)≠0.

For instance, when t=3Ts, s(t) in the equation (9) is out of series sum and equal to $I_3+jQ_3$, and a signal for t=3Ts is taken. However, when t=3Ts+Δτ, no series sum is taken, and therefore, the signals at other timing such as $I_2+jQ_2$, $I_4+jQ_4$ interfere, thus, intersymbol interference occurs.

An output signal y(t) of the first transversal filter is expressed as follows, where a number of delay means at an output of a beam former is M, and the second weight means provides the weights c0 through cM.

$$y(t)=\exp(j2\pi\Delta\mathrm{ft})\sum_{k=-\infty}^{\infty}$$

$$\left[\sum_{m=0}^{M} c_m\exp(-j2\pi\Delta f(\Delta\tau+mT_s/a)h(t-\Delta\tau-kTs/a)\right](I_k+jQ_k) \tag{10}$$

From the equations (9) and (10), the following equation must be satisfied for restoring base band signal at an output of the first transversal filter 107.

$$h(t-kTs)=\sum_{m=0}^{M} c_m\exp(-j2\pi\Delta f(\Delta\tau+mTs/a)h(t-\Delta\tau-kTs-mTs/a) \tag{11}$$

As the frequency converter control 117 controls so that the frequency conversion error in the first frequency converter 106 is the minimum, Δf=0 at the converged condition, and the equation (11) becomes as follows.

$$h(t-kTs)=\sum_{m=0}^{M} c_m h(t-\Delta\tau-kTs-mTs/a) \tag{12}$$

From the equation (12), it is clear that if the impulse response of a band restriction filter is real number, $c_0$ through $c_m$ are real number.

Figure 30:
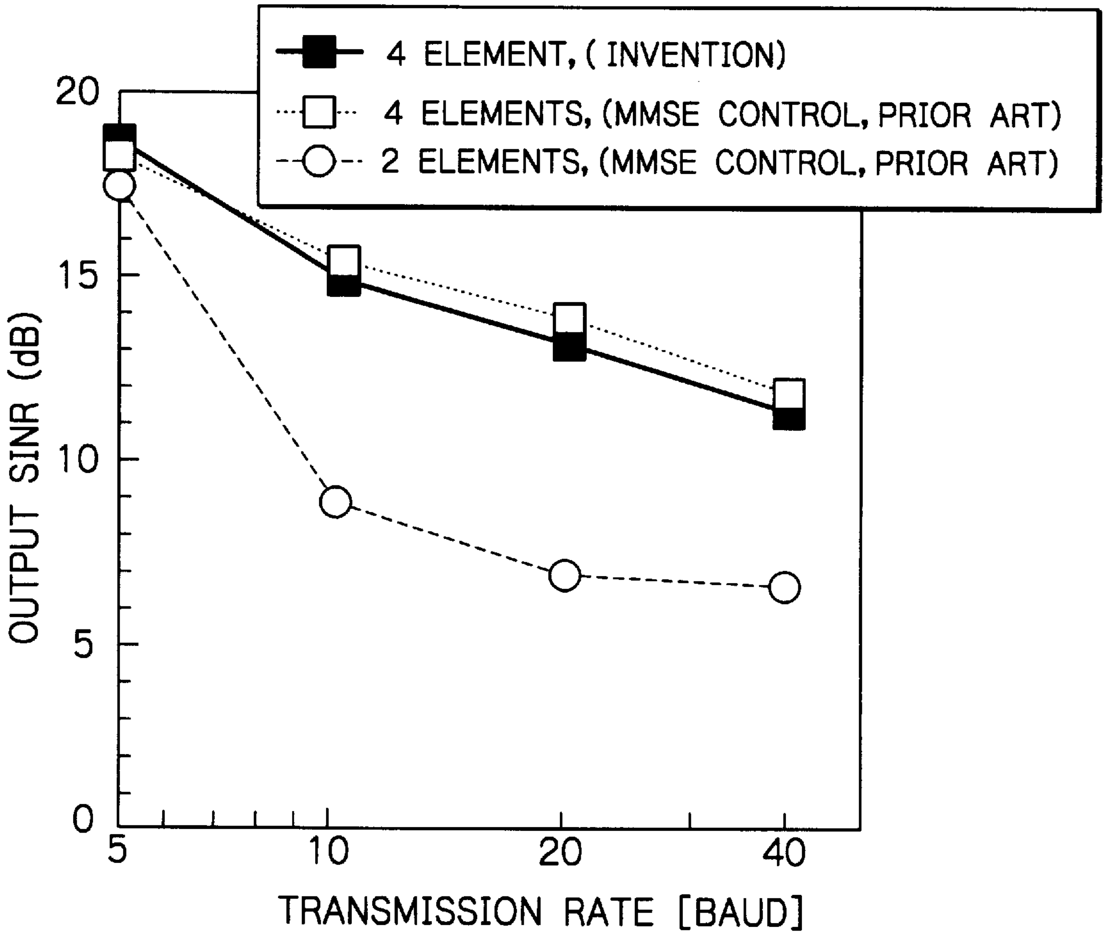
FIG. 30 shows a curve between transmission rate and output SINR.

FIG. 30 shows a result of the simulation showing the relations between transmission rate and output SINR of the present invention, and a prior art that the second weight in the first transversal filter is complex number each coefficient of which is controlled through MMSE (Minimum Mean Square Error) method.

The environment is room transmission environment having 20 m×20 m. An output SINR is an average for 10000 symbols. In the simulation, the first transversal filter 107 has three delay elements, each having delay time 0.5 Ts. It is assumed that the sampling frequency of the first A/D converter 105 is offset by 1000 ppm Hz (1 ppm=$10^{-6}$ Hz) from twice of bau rate.

In case of four antenna elements (N=4), it should be appreciated that the present adaptive array antenna system has the similar characteristics of output SINR vs transmission rate to that of the case which has complex coefficients, although the present invention has real coefficients for the second weights in the first transversal filter 107.

According to the embodiment of FIG. 7, the first transversal filter 107 carries out only the timing compensation. Therefore, the analog beam former 102 carries out only the improvement of transmission quality, and the first transversal filter carries out only the timing compensation. Therefore, the present invention operates stably even under poor transmission environment.

Further, as the second weights are real numbers, an amount of hardware of the first transversal filter is decreased to half as compared with that of a prior art.

Figure 11:
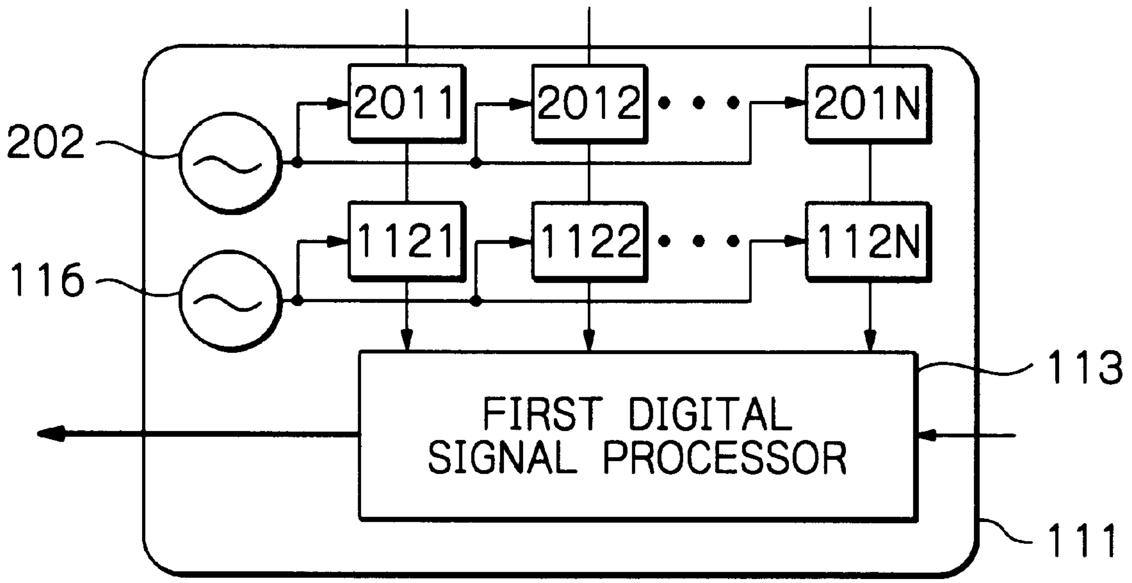
FIG. 11 is another first weight control 111.
Figure 12:
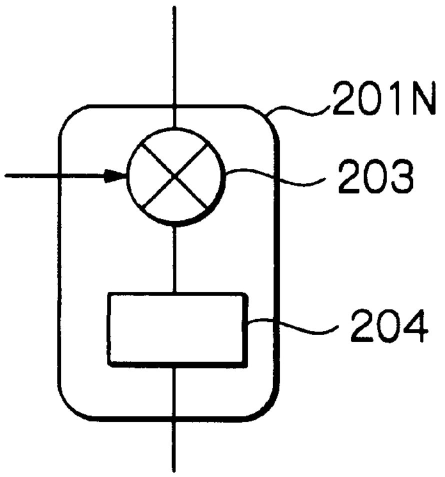
FIG. 12 is a second frequency converter 2011 through 201N in FIG. 13.

Now, another embodiment of the present invention is described in accordance with FIGS. 11 and 12, in which N number of antenna elements are used, a first A/D converter and a second A/D converter are asynchronous with a receive signal, a second weight in a first transversal filter is a real number, and a first weight control converts a receive signal to an intermediate frequency (IF) by using a second frequency converter before A/D conversion is carried out.

FIG. 11 shows the current embodiment, and has the same numerals as those in FIG. 7. In FIG. 11, the numerals 2011 through 201N are second frequency converters, and 202 is an oscillator. FIG. 12 shows a structure of second frequency converters 2011 through 201N, in which 203 is a mixer and 204 is a low pass filter.

In the current embodiment, a receive signal at antenna elements 1011 through 101N is applied to a first weight control 111, which converts a receive signal to IF frequency by using a second frequency converters 2011 through 201N, and converts the signal into digital form by using the second A/D converters 1121 through 112N. In each of the second frequency converters 2011 through 201N, a receive signal at antenna elements 1011 through 101N and a signal from the oscillator 202 are applied to the mixer 203. An output of the mixer is applied to the low pass filter 204 which provides an output IF signal after suppressing harmonic components.

Since a receive signal at antenna elements is converted to IF frequency, and an input frequency to an A/D converter is low in the current embodiment, it has the advantage that RF frequency at radio section may be high, and an A/D converter consumes less power.

Figure 13:
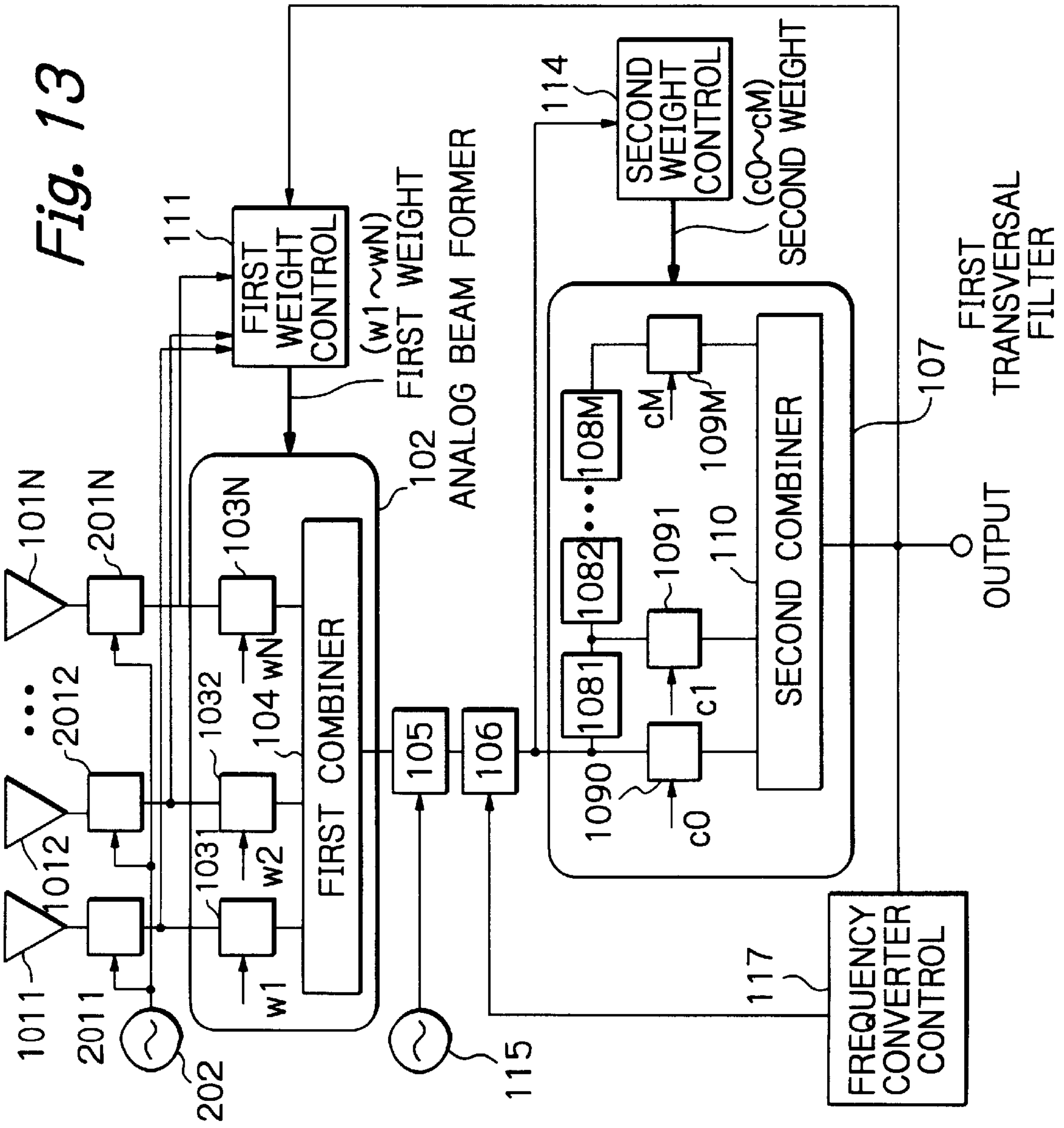
FIG. 13 is a block diagram of another embodiment of the present invention.

Now, another embodiment is described in accordance with FIG. 13, in which a receive signal at antenna elements is converted to an IF signal by using a second frequency converter, and an IF signal thus converted is applied to an analog beam former and a first weight control. In FIG. 13, the same numerals as those in FIGS. 7 through 12 show the same members.

In the current embodiment, a receive signal at antenna elements 1011 through 101N is converted to an IF signal by using second frequency converters 2011 through 201N, then, an IF signal thus converted is applied to an analog beam former 102 and a first weight control 111.

In the current embodiment, since a receive signal at antenna elements is converted to an IF signal, an analog beam former 102 operates at IF frequency. Therefore, RF frequency in radio section may be high, an A/D converter consumes less power, and an analog beam former 102 may operate at low frequency.

Figure 14:
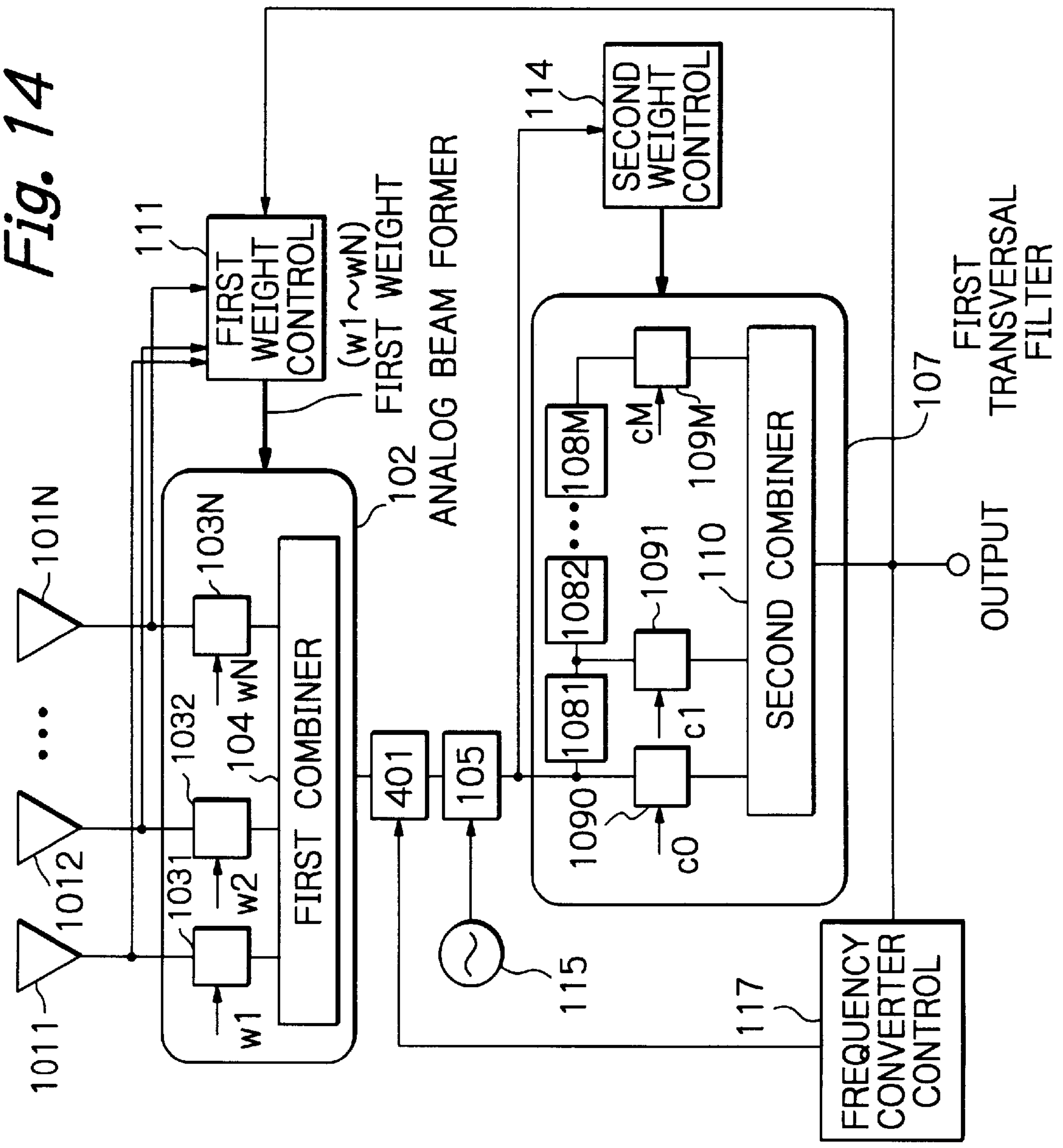
FIG. 14 is another embodiment of the present invention.
Figure 15:
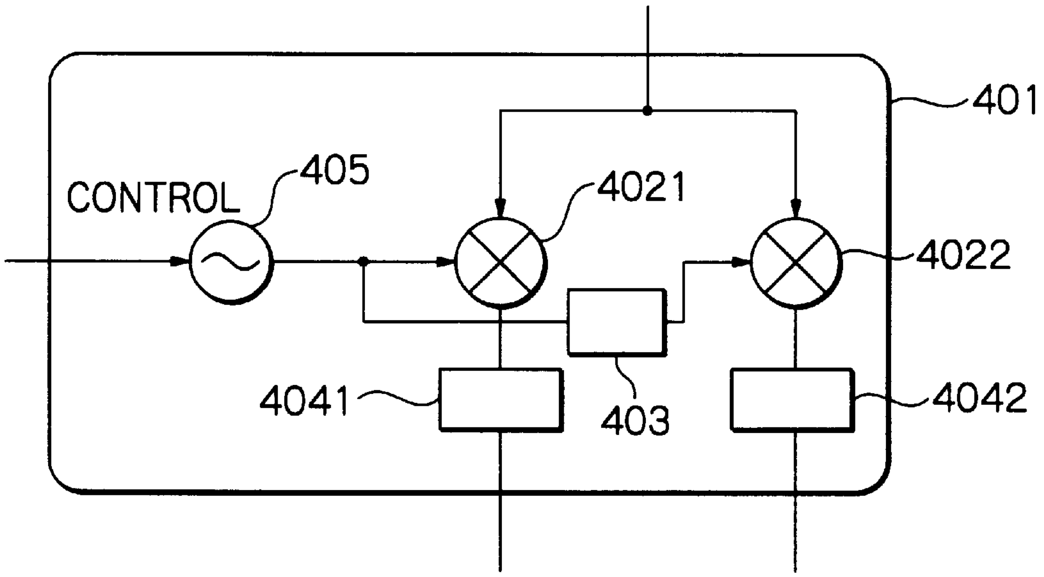
FIG. 15 is a third frequency converter 401 in FIG. 14.

Now, still another embodiment is described in accordance with FIGS. 14 and 15. The same numerals as those in FIGS. 7 through 13 are used. In FIG. 14, 401 is a third frequency converter which has the structure as shown in FIG. 15. In FIG. 15, 4021 and 4022 are mixers, 403 is a ¶/2 phase shifter, 4041 and 4042 are a low pass filter, and 405 is an oscillator.

An output of an analog beam former 102 is applied to the third frequency converter 401, in which an output of the analog beam former 102 is divided to two signals, each applied to the mixers 4021, and 4022, respectively. The mixer 4021 receives an output of the analog beam former 102 and a sine wave of the oscillator 405. An output of the mixer 4021 is applied to the low pass filter 4041, which suppresses harmonic component. On the other hand, the mixer 4022 receives an output of the analog beam former 102 and a sine wave of the oscillator 405 through a ¶/2 phase shifter 403. Thus, a local frequencies applied to the mixers 4021 and 4022 have the phase difference by ¶/2. Therefore, the low pass filters 4041 and 4042 provide a baseband signal having inphase component (real part) and quadrature component (imaginary part). This is described in a book "Modulation/Demodulation in Digital Radio Communication" by Saito, published by Institute of Electronics, Information and Communication in Japan, Aug. 20, 1996.

An output of the third frequency converter 401 including a real part and an imaginary part is applied to the first A/D converter 105. The oscillation frequency by the oscillator 405 is controlled by the frequency converter control 117 so that center frequency of an output of the first transversal filter 107 is zero.

The current embodiment has the advantage that an A/D converter consumes less power, since an A/D conversion is carried out for baseband signal.

Figure 16:
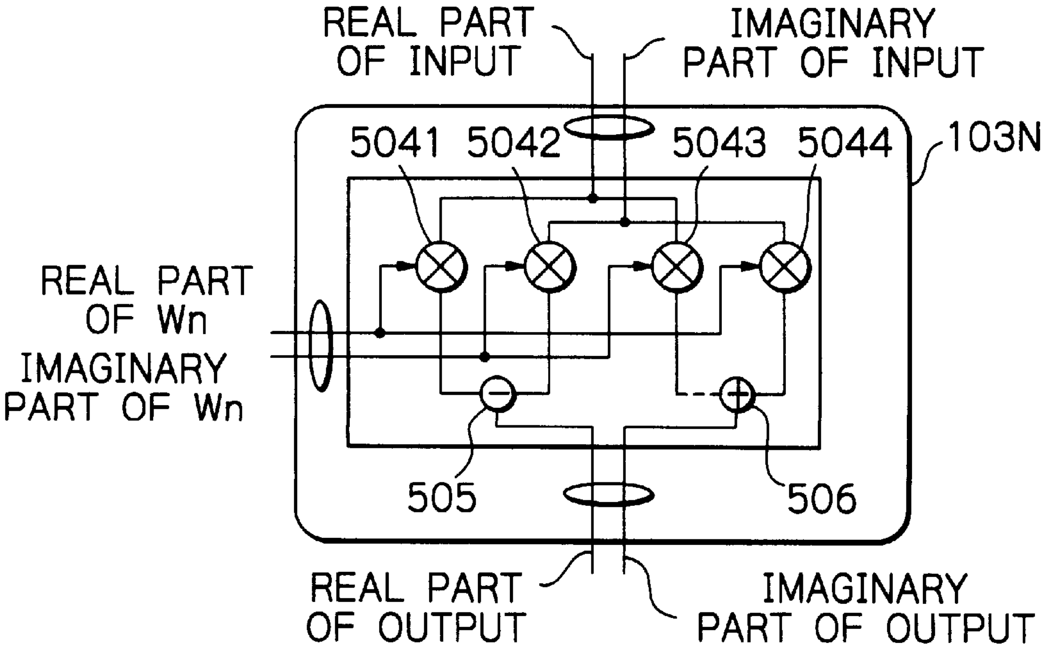
FIG. 16 is a first weight means 1031 through 103N in FIG. 17.
Figure 17:
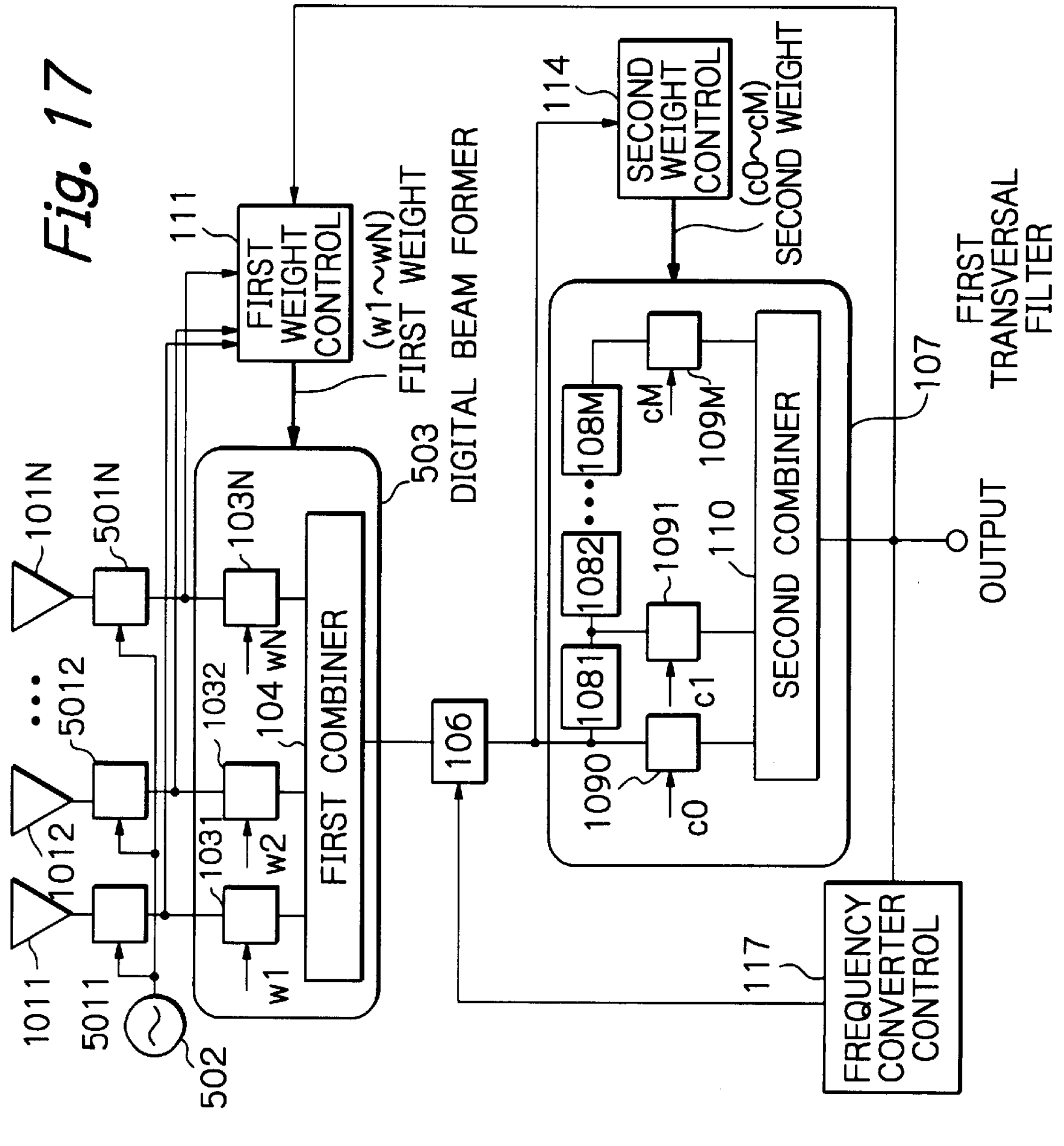
FIG. 17 is still another embodiment of the present invention.

Now, still another embodiment is described in accordance with FIGS. 16 and 17, in which a beam former operates for digital signal. The same numerals in FIGS. 16 and 17 are the same as those in the previous embodiments.

In FIG. 17, 5011 through 501N are first A/D converters, 502 is a sampling clock generator which supplies sampling timing to the first A/D converters 5011 through 501N, 503 is a digital beam former. FIG. 16 shows a first weight means 1031 through 103N, in which 5041 through 504N are multipliers, 505 is a real subtractor, and 506 is a real adder.

A receive signal at antenna elements 1011 through 111N is converted into digital form by the first A/D converters 5011 through 501N, which divide a receive signal into a real part and an imaginary part. The manner for dividing a signal into a real part and an imaginary part is as follows.

(1) A receive signal at antenna elements is first sampled with sampling frequency higher than twice of the center frequency of the receive signal, then, sampled signal is converted into digital form, and then, the Hilbert transformation is carried out to the digital signal. This is described in "Digital Signal Processing" by Oppenheim and Shafer (JP translation by Date, Corona Co. second volume pages 26–30 1978).

(2) A receive signal at antenna elements 1011 through 101N is sampled with sampling frequency four times as high as the center frequency of the receive signal. A real part is a signal sampled by an even sample, and an imaginary part is a signal sampled by an odd sample.

(3) A receive signal is divided into two signals having phase difference by ¶/2 with each other. Each divided signals are applied to separate A/D converters 5011 through 501N. Each A/D converters sample with sampling frequency higher than twice of the center frequency. Each outputs of the A/D converters are real part and imaginary part.

An A/D converted signal is applied to the digital beam former 503, in which first weight means 1031 through 103N provide complex weights, and a first combiner 104 combines the weighted signals and provides an output signal. The complex weight in the first weight means is implemented as follows.

As described before, each of the first A/D converters 5011 through 501N provides a real part and an imaginary part. And, as weight is complex number, it may be divided into a real part and an imaginary part. The complex weight is carried out as follows.

(Real part of complex weighted output)=(real part of complex weight)*(real part of an input signal)−(imaginary part of complex weight)*(imaginary part of an input signal)

(Imaginary part of complex weighted output)=(imaginary part of complex weight)*(imaginary part of an input signal)+(imaginary part of complex weight)*(real part of an input signal)

The current embodiment has the advantage that it is free from temperature variation, forms stable beam, and provides beam control with high precision, since a beam is formed through digital signal processing.

Figure 18:
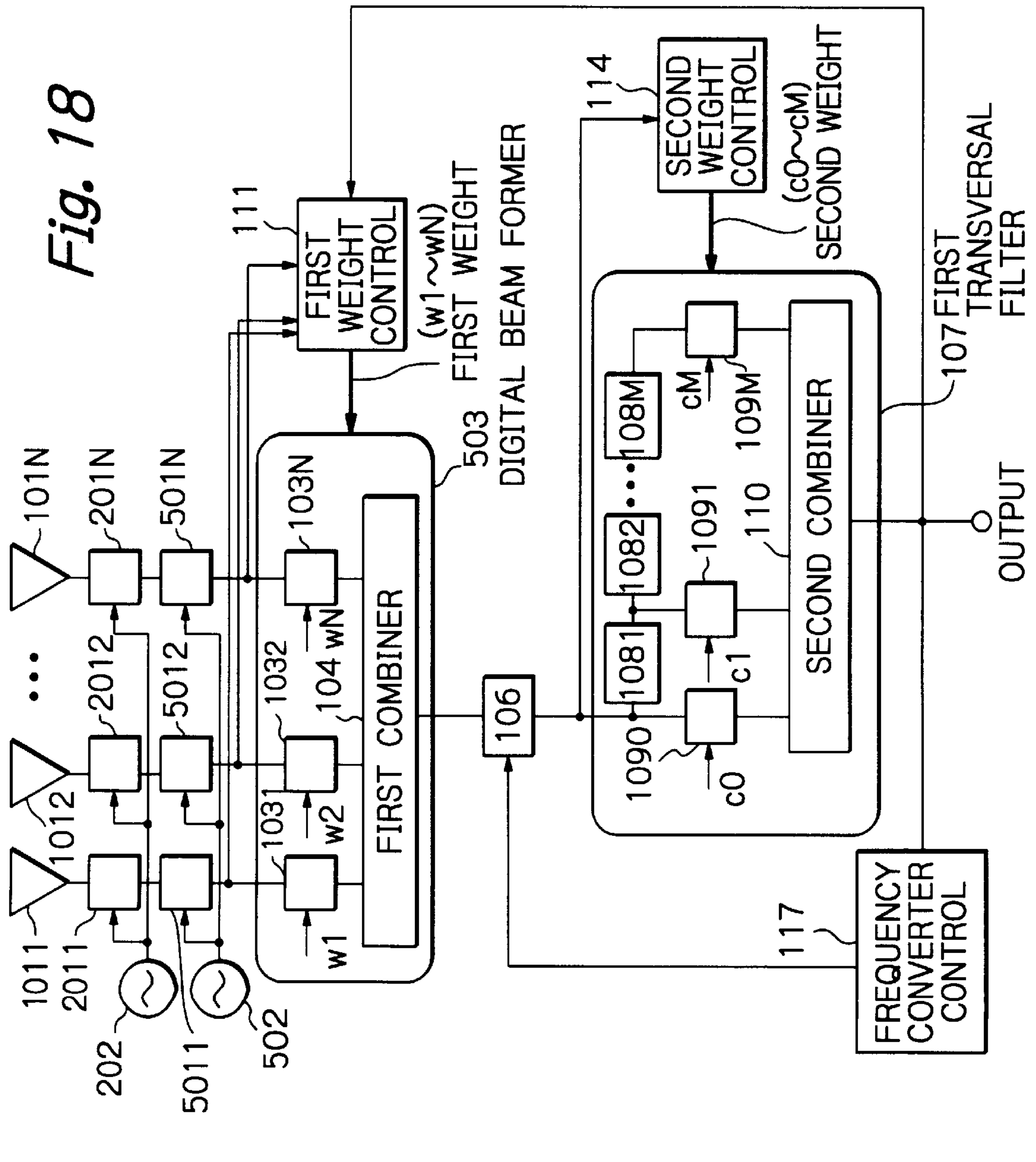
FIG. 18 is still another embodiment of the present invention.

Now, still another embodiment is described in accordance with FIG. 18, in which a receive signal at antenna elements is converted to IF signal which is applied to a digital beam former and a first weight control.

In FIG. 18, the same numerals as those in FIGS. 7–17 show the same members.

In FIG. 18, a receive signal at antenna elements 1011 through 101N is applied to a digital beam former 503, through a second frequency converter 2011 through 201N which convert a receive signal to IF frequency, and A/D converters 5011 through 501N.

The current embodiment has the advantage that a receive signal at antenna elements is converted to IF frequency, and therefore, RF frequency in radio section may be high, and an A/D converter consumes less power.

Figure 19:
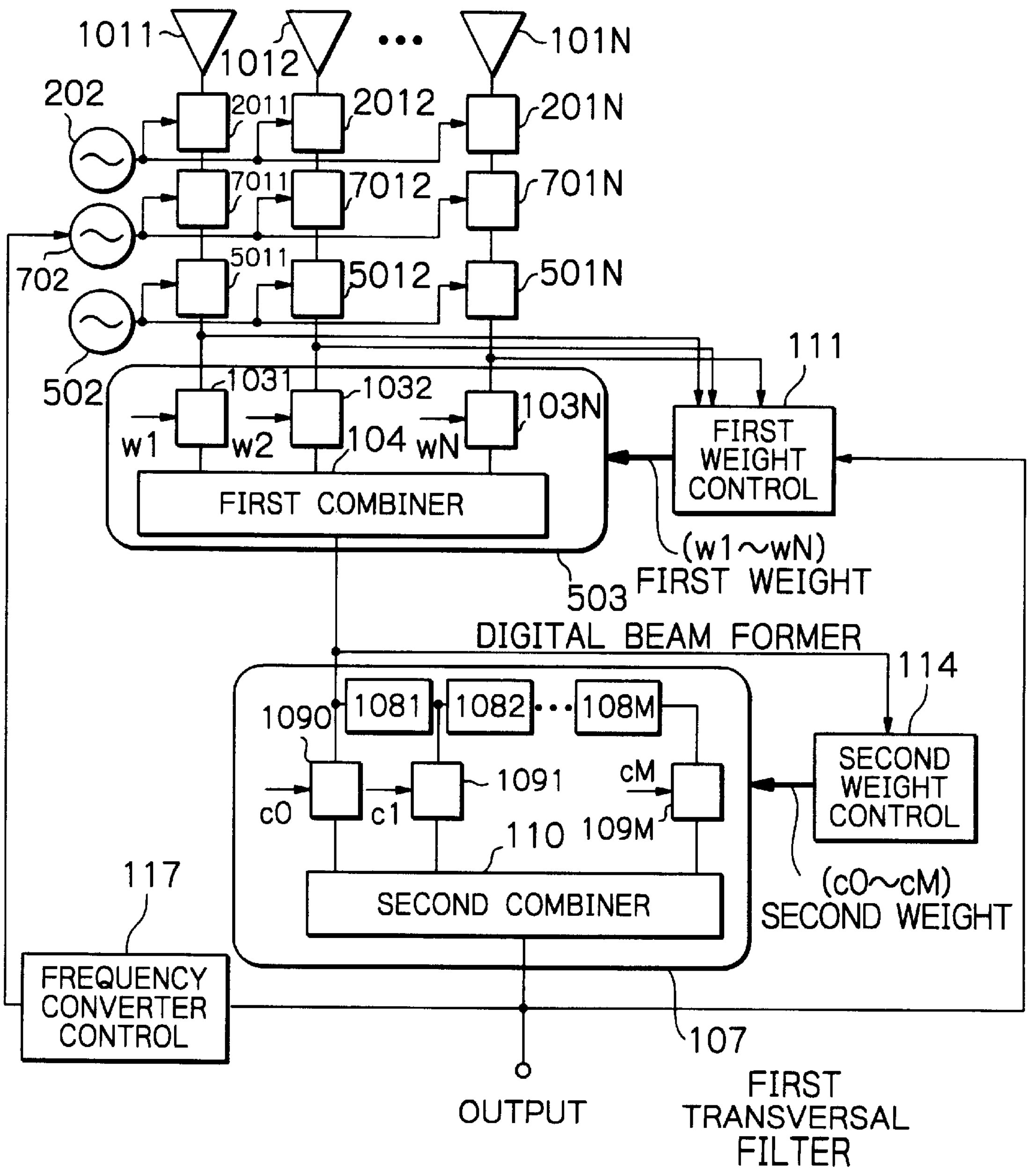
FIG. 19 is still another embodiment of the present invention.

FIG. 19 shows still another embodiment, in which a receive signal is detected and converted to baseband signal. Then, the baseband signal is converted into digital form and is applied to a digital beam former.

In FIG. 19, 7011 through 701N are third frequency converters which are shown in FIG. 15, and 702 is an oscillator.

A receive signal at antenna elements is converted to IF frequency by second frequency converters 2011 through 201N, and then, converted to baseband signal by third frequency converters 7011 through 701N. An input signal to third frequency converters may be either IF frequency or RF frequency. In the latter case, second frequency converters would be omitted. The third frequency converters 7011 through 701N provide an output signal having a real part and an imaginary part, as previously described in accordance with FIG. 15.

A real part and an imaginary part of an output of the third frequency converters 7011 through 701N are applied to first A/D converters 5011 through 501N for A/D conversion. The oscillation frequency of an oscillator 702 for third frequency converters is controlled so that center frequency of an output of a first transversal filter 107 is zero by frequency converter control 117.

The current embodiment has the advantage that an A/D converter consumes less power, since A/D conversion is carried out for baseband signal.

Now, still another embodiment is described in accordance with FIGS. 20 through 23, in which an environment measure is provided for measuring whether transmission path is under frequency selective fading environment or not, and a multiplier in a second weight means is modified according to transmission environment.

Figure 20:
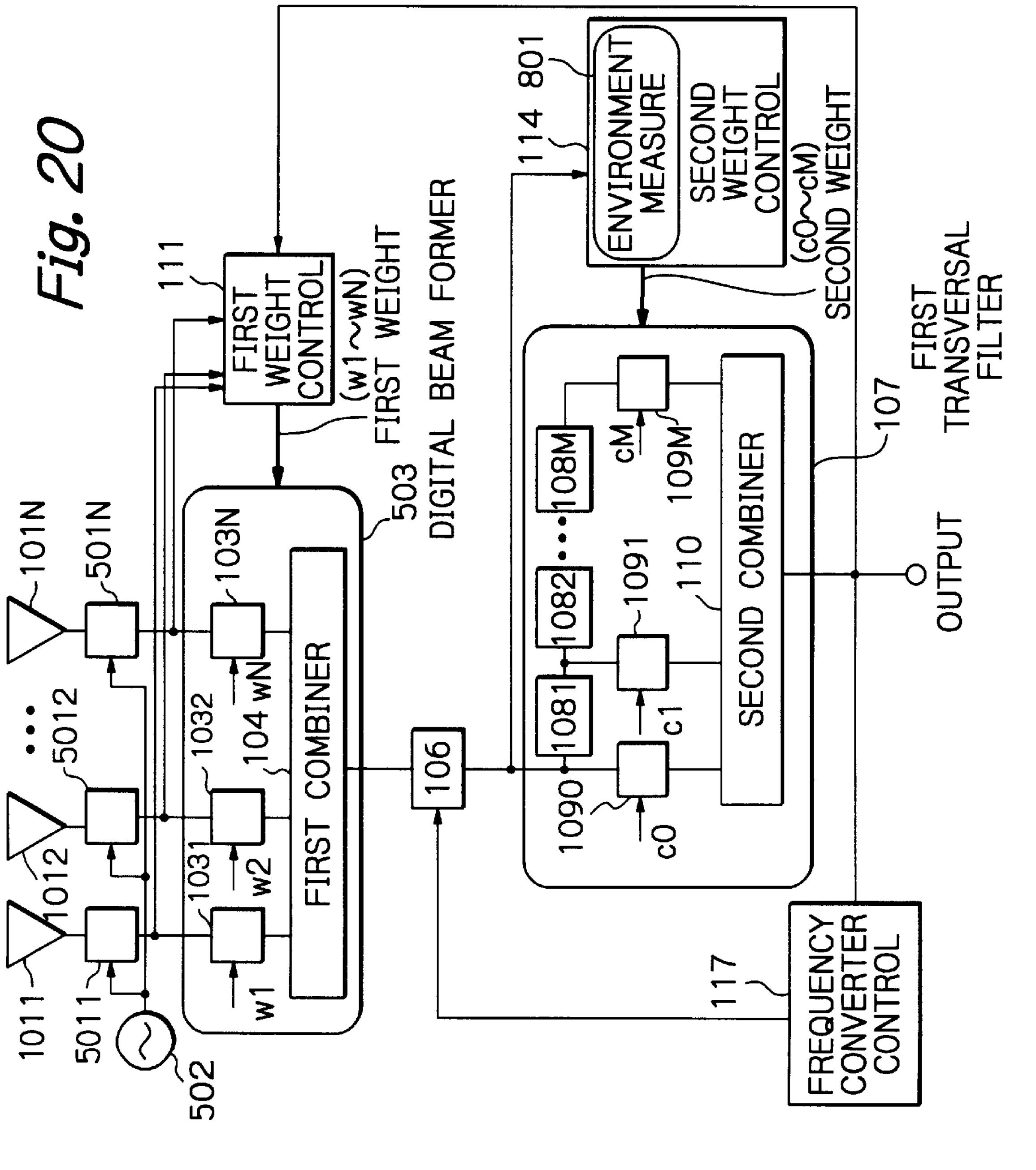
FIG. 20 is still another embodiment of the present invention.
Figure 21:
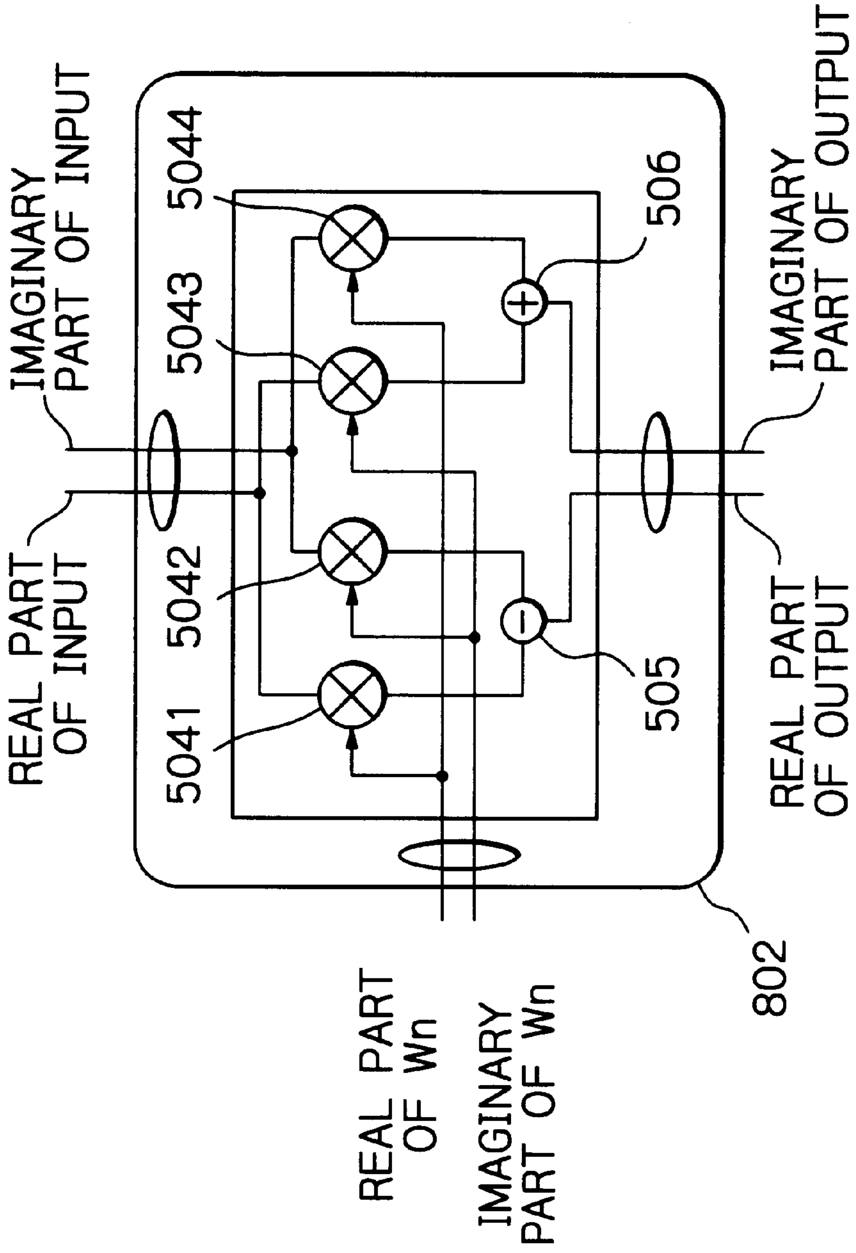
FIG. 21 is a block diagram of a complex coefficient multiply circuit 802 in FIG. 20.
Figure 22:
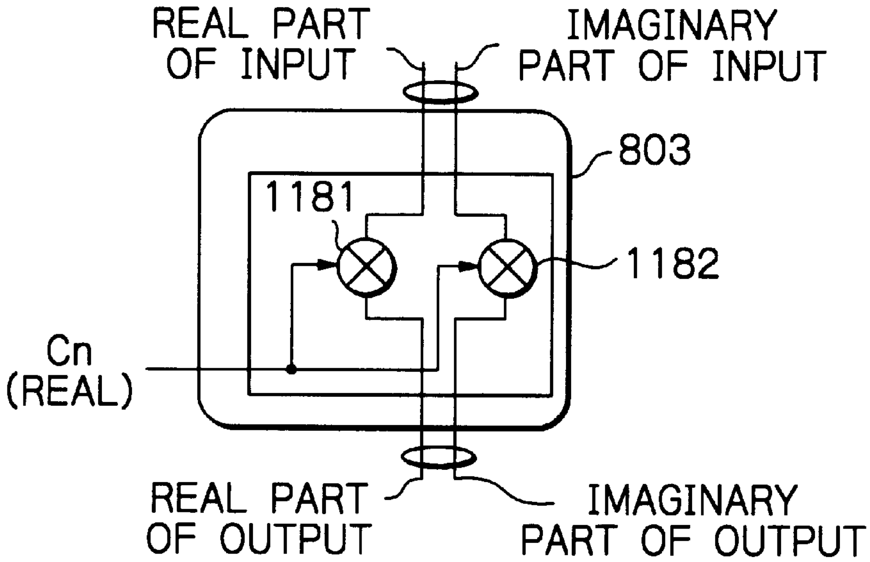
FIG. 22 is a real number coefficient multiply circuit 803 used in FIG. 21.

In FIG. 20, the same numerals as those in FIGS. 7 through 19 show the same members. The numeral 801 is an environment measure. FIG. 21 shows a complex multiplier 802, and FIG. 22 shows a real multiplier 803.

The complex multiplier 802 and the real multiplier 803 are provided in the second weight means 1090 through 109M, and one of them is selected by the environment measure 801.

Figure 23:
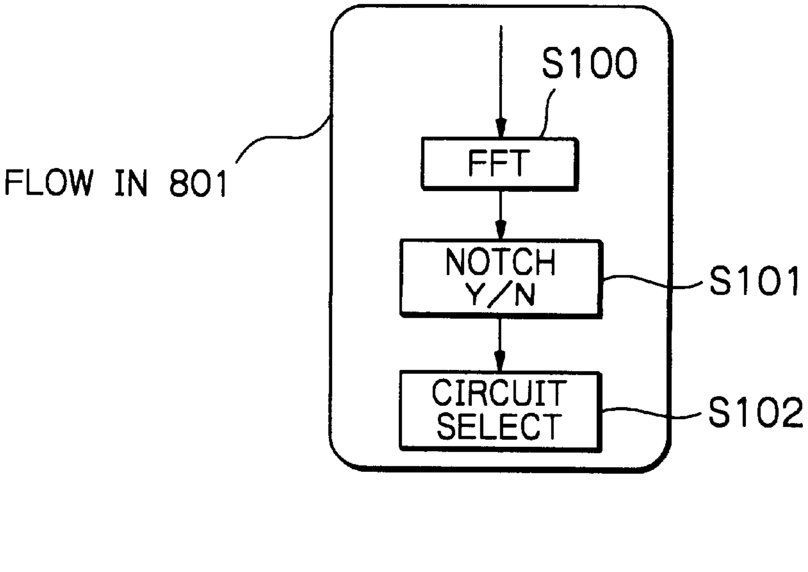
FIG. 23 is a signal process flow of environment measure 801.

FIG. 23 shows an operational flow of an environment measure 801, which has the steps of FFT (Fast Fourier Transform) step (S100), a notch step (S101), and a circuit select step (S102).

The environment measure 801 receives an output of a first frequency converter 106, and provides frequency characteristics of an output signal of the first frequency converter through Fourier transformation. When the frequency characteristics has a notch in a transmission band, it is recognized as frequency selective fading environment, in which waveform equalization in a first transversal filter is not carried out well. In that case, the first transversal filter 107 carries out only timing compensation, and the second weight means 1090 through 109M has real weights.

On the other hand, when no notch exists in transmission band, it is recognized that no frequency selective fading exists. In this case, a delay signal delayed longer than one symbol period does not exist, and a waveform equalization is possible in a first transversal filter. Therefore, the first transversal filter has complex number in the second weight means 1090 through 109M so that the first transversal filter carries out both timing compensation and waveform equalization.

When the weights in the second weight means 1090 through 109M in the first transversal filter 107 are complex number, the environment measure 801 provides an instruction to a digital signal processor for providing complex multiplier 802, and the second weight means 1090-109M in the first transversal filter 107 provide complex weights.

When the weights in the second weight means 1090 through 109M are real number, the environment measure 801 provides an instruction to a digital signal processor for providing real multiplier 803, and the second weight means 1090 through 109M in the first transversal filter 107 provide real weights.

The current embodiment has the advantage when it is used in a variable rate system. In a high transmission rate, a second weight means has real weights so that a first transversal filter operates stable and consumes less power, and in a low transmission rate, high quality transmission is obtained by both spatial and time waveform equalization.

Figure 24:
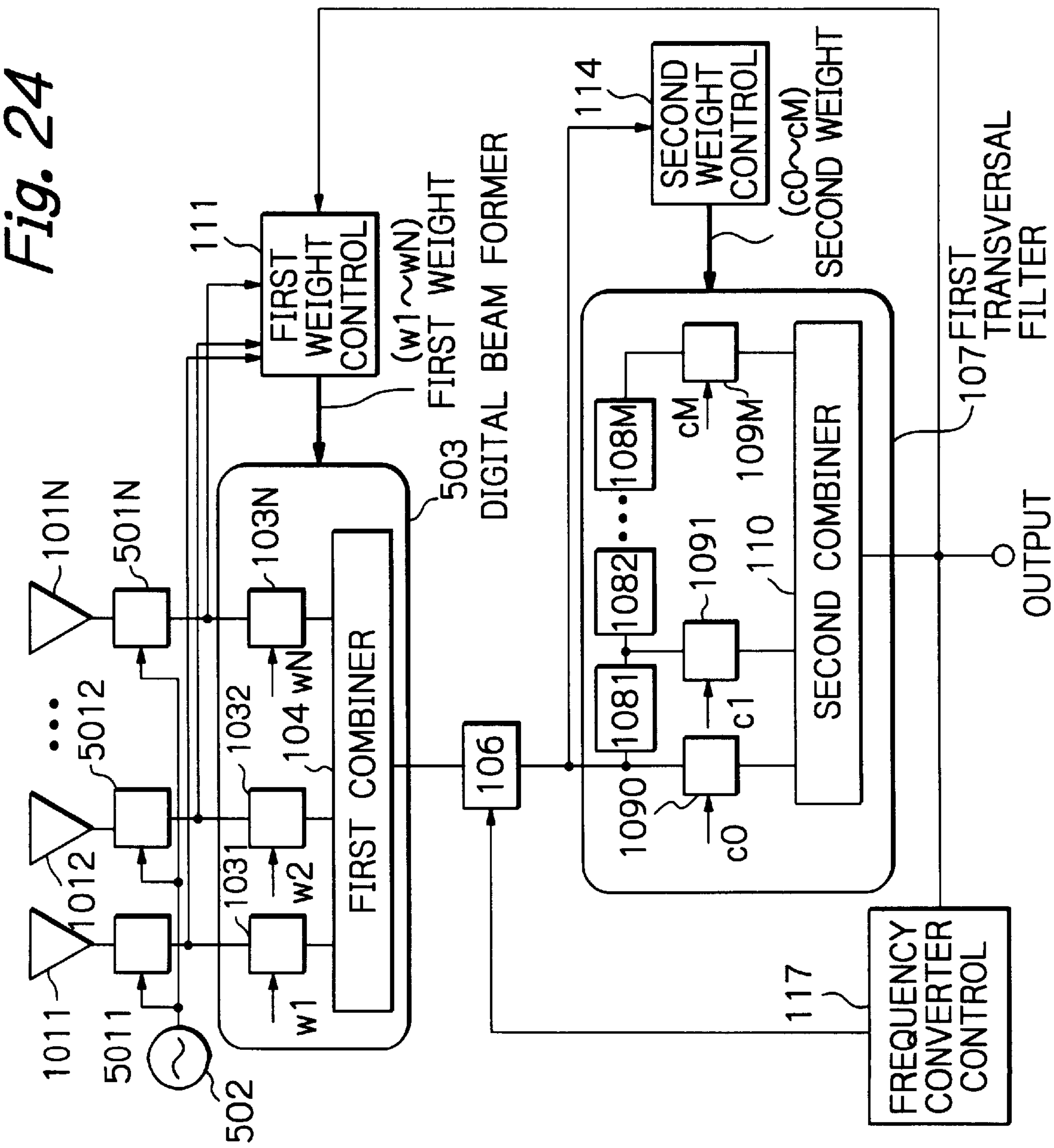
FIG. 24 is still another embodiment of the present invention.
Figure 25:
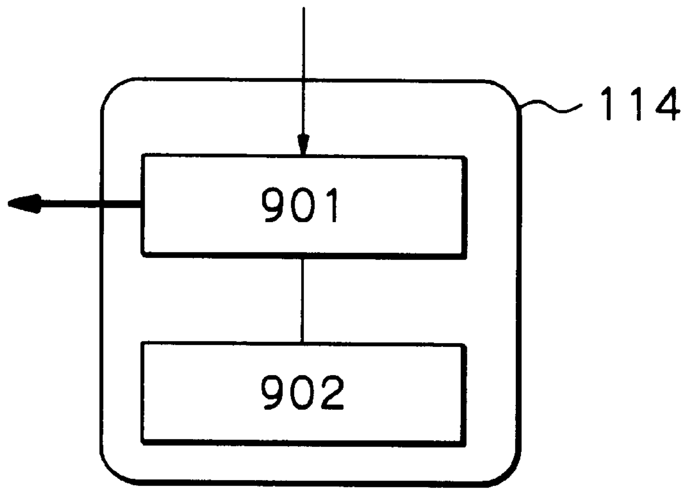
FIG. 25 is a second weight control 114 in FIG. 24.

Now, still another embodiment is described in accordance with FIGS. 24 and 25, in which the second weight is determined so that an amplitude variation error of an output signal is the minimum in the second weights which correspond to discrimination timing error.

In FIG. 24, the same numerals as those in FIG. 7 through 23 show the same members. FIG. 25 shows a second weight control 114 in FIG. 24. In FIG. 25, the numeral 901 is a transmission quality estimation means which estimates an error of amplitude of an output of the first transversal filter 107 from a desired value when a set of second weights are determined, and 902 is a memory for storing a set of optimum weights of the second weight means 1090 through 109M corresponding to a timing error Δ between the sampling timing of the first A/D converters 1031 through 103N, and the optimum discrimination timing.

The transmission quality estimation means 901 reads out the memory 902 for each input of the transversal filter 107, and takes the optimum set of second weights corresponding to a timing error Δτ between the sampling timing in the first A/D converters 1031 through 103N, and the optimum discrimination timing, and estimates an error of an output of the adaptive antenna which uses each set of weights from a desired discrete value, by using the following equation.

$$Q=E[|(y-d1)(y-d2)(y-d3)\ \text{- - -}\ |] \quad (13)$$

where dn (n=1, 2, - - - ,L) is a desired discrete value. The set of second weights is determined so that the error Q is the minimum.

The current embodiment has the advantage that the optimum weights are determined stably even when an input signal to a first transversal filter 107 has frequency error and/or phase error.

Figure 26:
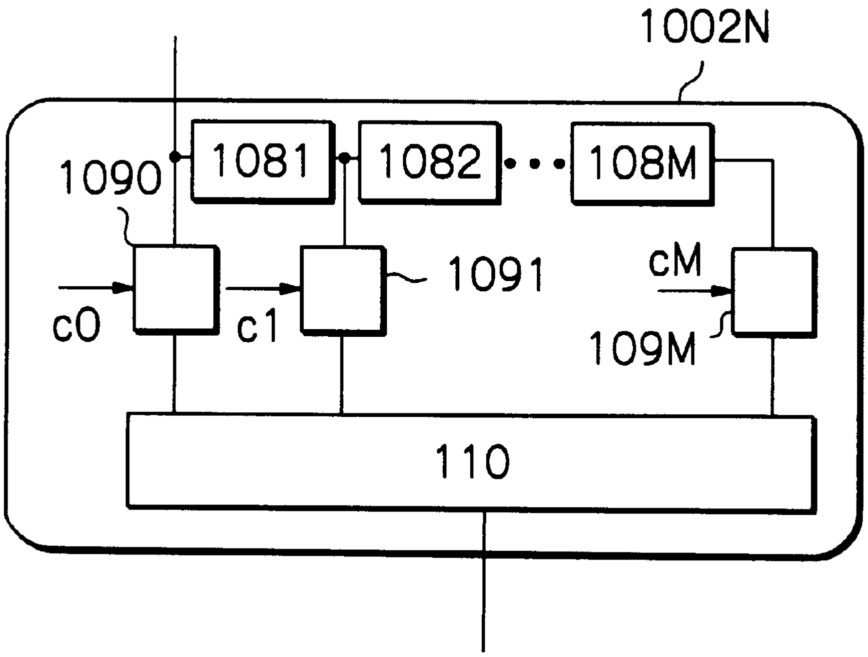
FIG. 26 is a second transversal filter 10021 through 1002N in FIG. 28.
Figure 27:
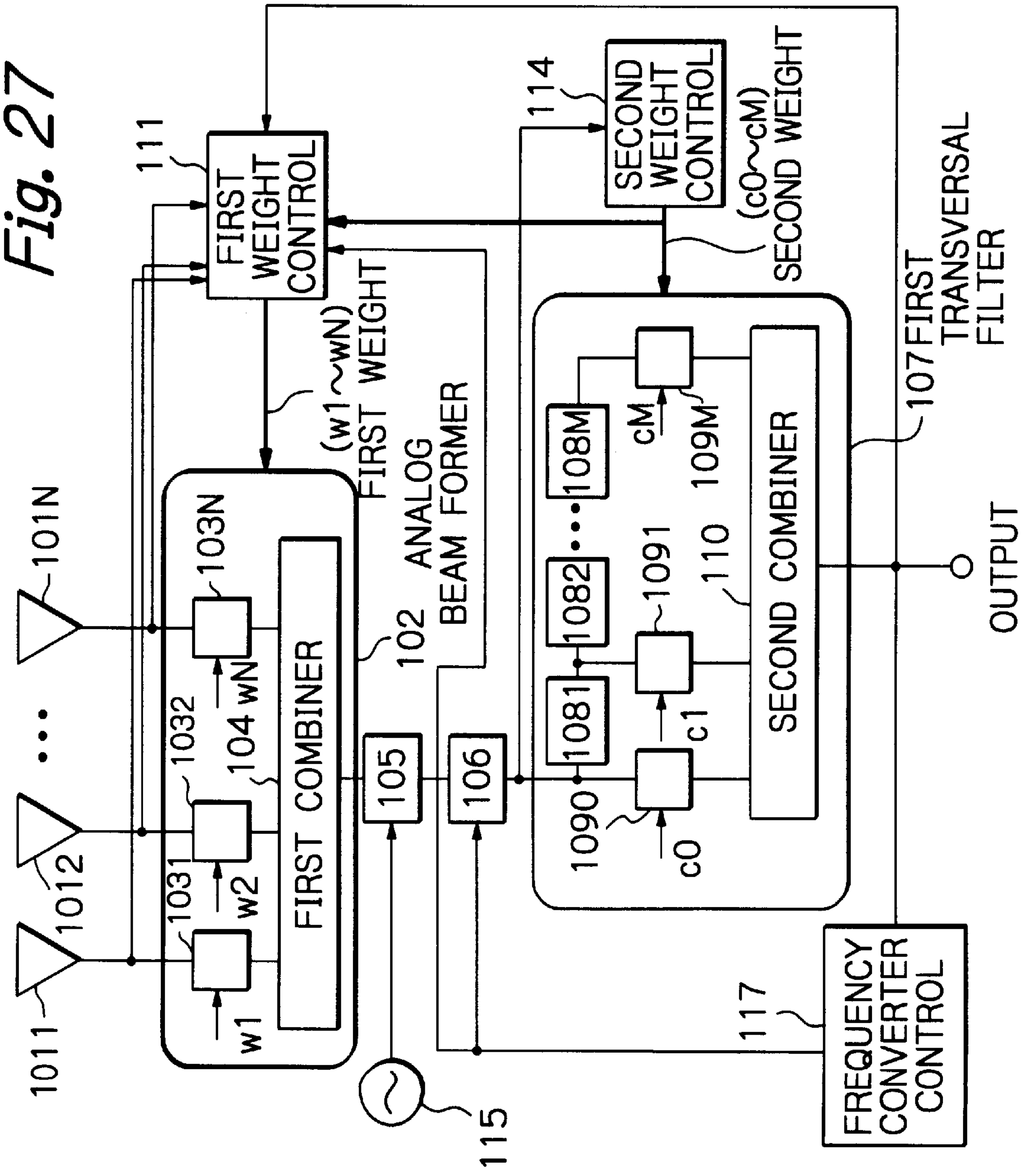
FIG. 27 is still another embodiment of the present invention.
Figure 28:
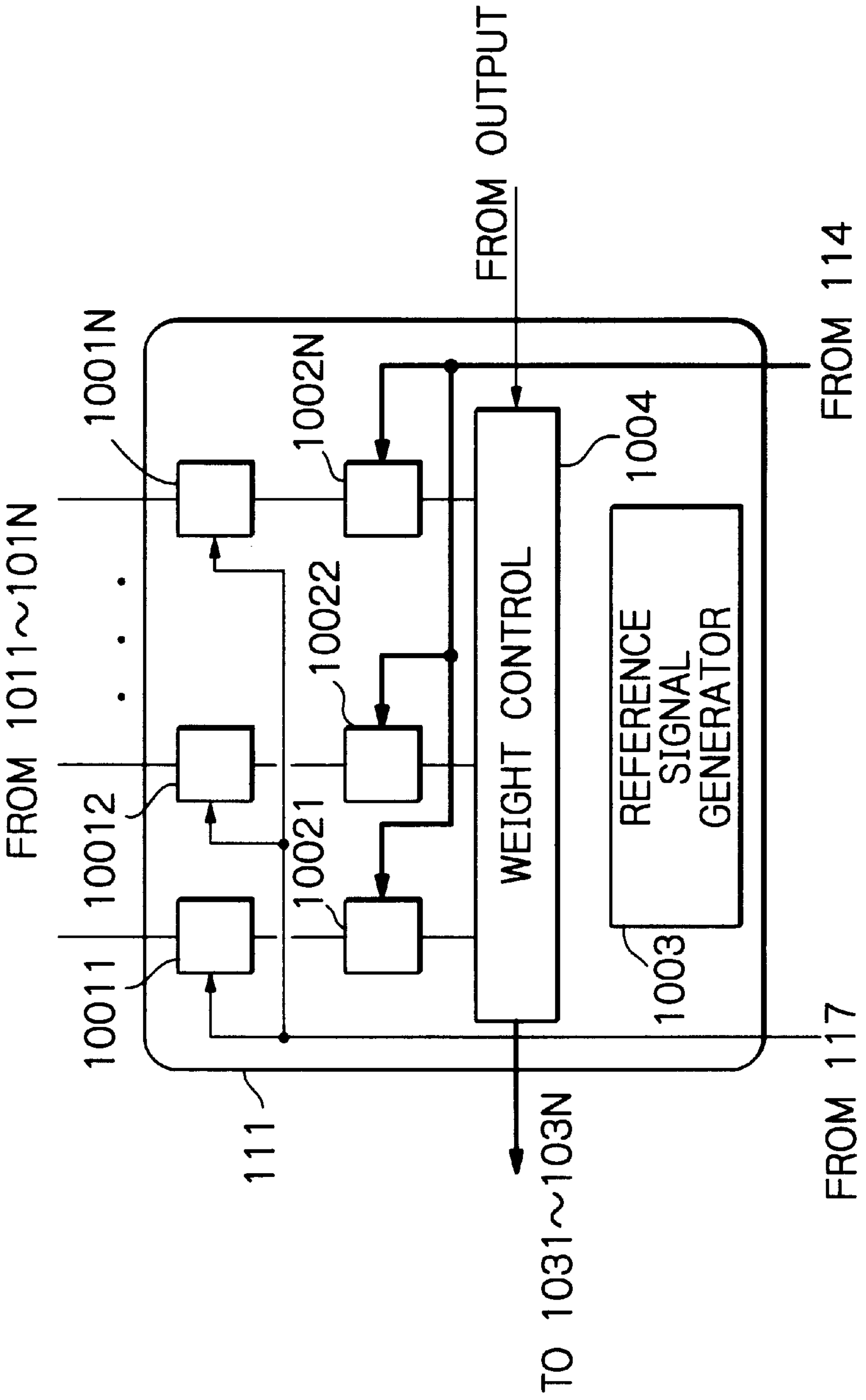
FIG. 28 is a first weight control 111.

Now, still another embodiment is described in accordance with FIGS. 26 through 28, in which FIG. 27 is a block diagram of the current embodiment, FIG. 28 is a first weight control 111 in FIG. 26. The numerals 10011 through 1001N are fourth frequency converters which are shown in FIG. 12. The numerals 10021 through 1002N are second transversal filters which are shown in FIG. 26. The numeral 1003 is a reference signal generator, and 1004 is a weight control.

A receive signal x1 through xN at antenna elements 1011 through 101N is applied to the first weight control 111 either directly as RF signal or through frequency conversion to IF signal. In the first weight 111, the receive signal x1 through xN is converted by the fourth frequency converters 10011 through 1001N and the second transversal filter 10021 through 1002N, as shown in the following equation, by using the weights of the second weight means 1090 through 109M determined by the first transversal filter 107, where xn' is an output signal of a calculation part of a transversal filter, M is a number of taps, cm is a tap coefficient, Ts/a is a tap period.

$$x_n'(t) = \sum_{m=0}^{M} c_m x_n(t - m(Ts/a))\ n = 1, \ldots, N \quad (14)$$

The weights for providing directivity pattern through minimum mean square error method is given by the equation (1), with the weights w1 through wN in the first weight means 1031 through 103N, and a reference signal d from a reference signal generator. Thus, an adaptive array antenna operates through minimum mean square error method by using asynchronous data.

Figure 29:
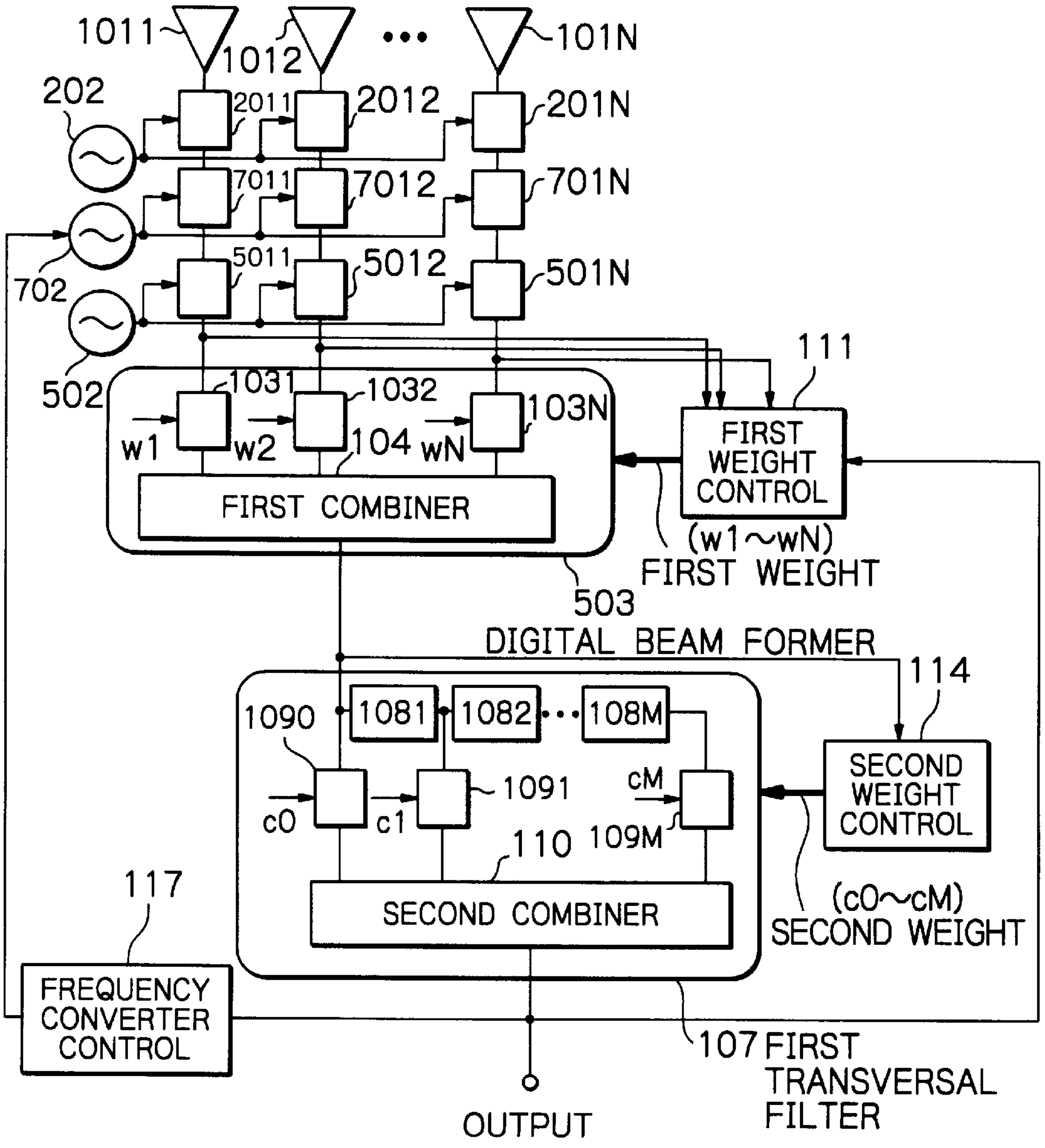
FIG. 29 is still another embodiment of the present invention.

Now, still another embodiment is described in accordance with FIGS. 28 and 29, in which a receive signal is converted to baseband signal before A/D conversion, and by using a first transversal filter, a beam former is controlled by using a demodulated signal for each antenna element.

In FIG. 29, the same numerals as those in FIGS. 7 through 28 show the same members.

A receive signal x1 through xN at antenna elements 1011 through 101N is converted to IF signal by second frequency converters 2011 through 201N, divided into inphase component and quadrature component of a baseband signal by third frequency converters 7011 through 701N. Each are applied to a first A/D converter 5011 through 501N, and a first weight control 111, respectively.

In the first weight control 111 (FIG. 11), a receive signal x1 through xN is converted by using the equation (14) in the second frequency converters 2011 through 201N and calculation part of the second transversal filter, by using the second weights determined by the first transversal filter 107. The weights for providing directivity pattern through the minimum mean square error method is given by the equation (1), where w1 through wN are first weights, and d is a reference signal given by a reference signal generator. Thus, an adaptive array antenna is controlled through the minimum mean square error method by using asynchronous data.

By the way, when a sampling timing in an A/D converter is asynchronous to a timing of a receive signal, it would undesirably happen that a sampling is carried out at switching point of a receive signal. This is avoided by using the structure of FIGS. 31 through 33.

Figure 31:
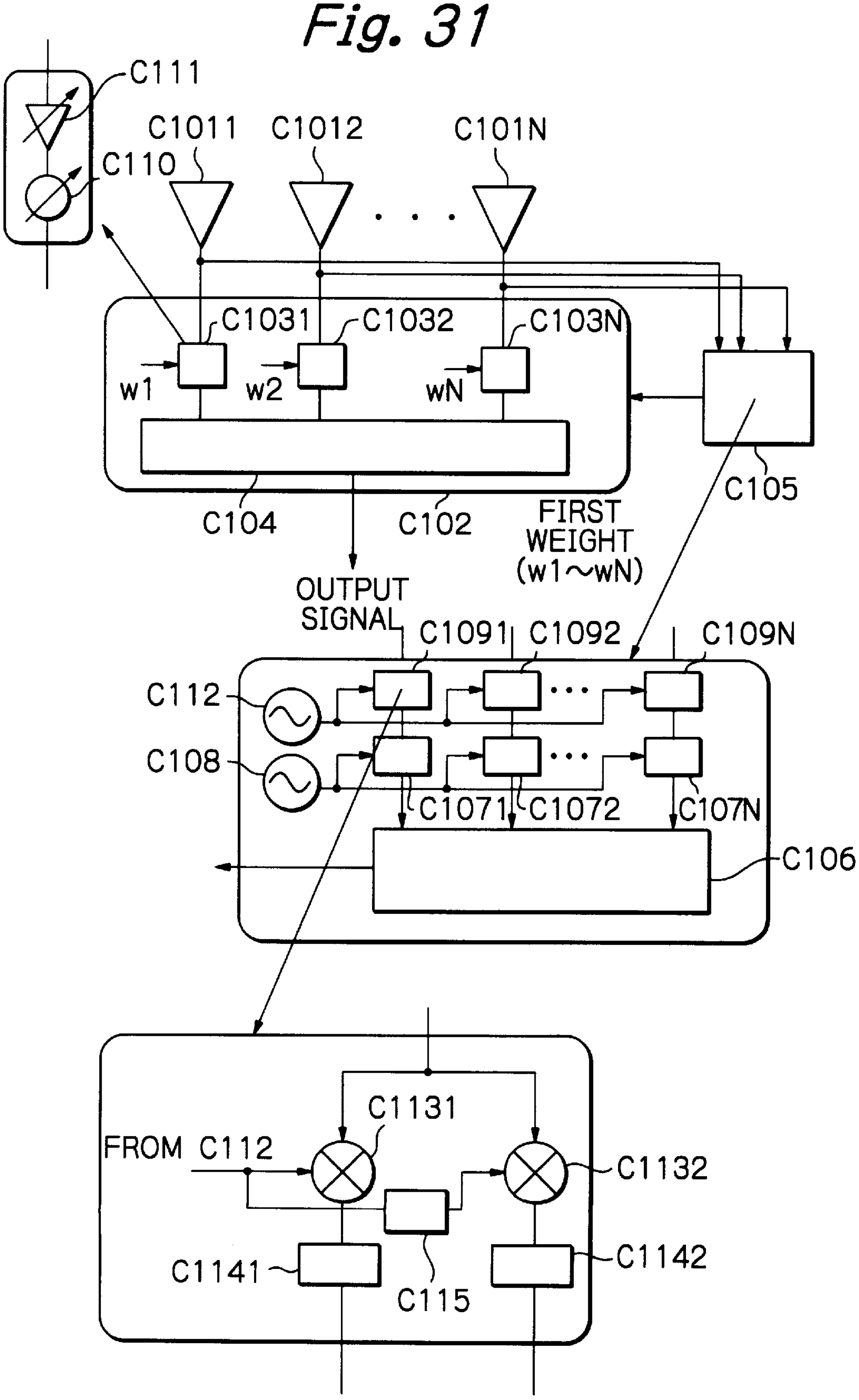
FIG. 31 is still another embodiment of the present invention.

FIG. 31 shows that an eigen vector beam is formed by using a sampling clock which is asynchronous to a signal transmission rate.

In FIG. 31, the symbols C1011 through C101N are antenna elements, C102 is an analog beam former, C1031 through C103N are first weight means, C104 is a first combiner, C105 is a weight control, C106 is a digital signal processor, C1071 through C107N is a first A/D converter, C108 is a sampling clock generator, C1091 through C109N is a first quasi coherent detector, C110 is an analog variable phase shifter, C111 is an analog variable amplifier, C112 is an oscillator for quasi coherent detector, C1131 through C1132 is a mixer, C1141 through C1142 is a low pass filter, and C115 is a 90° phase shifter.

Receive signals x1 through xN at antenna elements C1011 through C101N are applied to the analog beam former C102 and the first weight control C105. When a receive level is low, a receive signal is applied to the analog beam former C102 and the first weight control C105 after amplification by a low noise amplifier (not shown). The analog beam former C102 carries out the weighting wl through wN in the first weight means C1031 through C103N so that weight signals w1x2, w2x2, - - - ,wNxN are obtained. The modification of amplitude and phase is carried out by coupling a variable gain amplifier C111 and a variable phase shifter C110 in series and each of them is controlled properly. The weighted signals are combined in the first combiner C104 which provides an output signal y as follows.

$$y=w1x1+w2x2+ - - - +wNxN$$

The values w1 through wN are determined by the weight control C105, in which a receive RF signal is quasi coherent detected by a first quasi coherent detectors C1091 through C109N, and divided into an inphase component and a quadrature component. This is described, for instance, in "Digital I/Q Detection Technique" by Shinonaga et al, Technical Report of IEICE Sane 94-59 (1994-11) pages 9–15. A common oscillator C112 is used for quasi coherent detection for a receive signal from antenna elements. Each signals are converted into digital form by first A/D converters C1071 through C107N, and applied to the digital signal processor C106. The digital signal processor provides correlation matrix $R_{xx}$ among antenna elements.

As a receive signal from antenna elements is quasi coherent detected, by using the common oscillator C112, an error of carrier phase is common to all the signals of the antenna elements, and thus, a carrier phase error is completely removed by the calculation of the correlation matrix $R_{xx}$ of the equation (2). Accordingly, the correlation matrix $R_{xx}$ among antenna elements is accurately obtained even in asynchronous situation.

The digital signal processor provides an eigen vector by using the thus obtained correlation matrix. The eigen vector is obtained by the following calculation. First, a vector V0, which is arbitrary, is determined. Then, a vector Vk converges according to the following steps.

$$V_{k+1}=R_{xx}V_k/|V_k| \quad (15)$$

When $V_k$ converges to $V_{conv}$, the weight vector W is determined as follows so that a directivity is determined.

$$W=V_{conv} \quad (16)$$

This embodiment has the advantage that the directivity is formed only by correlation matrix among antenna elements, but is independent from carrier synchronization.

The beam formation before synchronization is established requests not only carrier synchronization, but also timing synchronization.

Therefore, sampling clock is determined essentially twice as high as transmission rate, and the correlation matrix is provided by mean value of $R_{xx}(\Delta t)$ and $R_{xx}(\Delta t+Ts/2)$ as shown in the following equation.

$$R_{xx}=[R_{xx}(\Delta t)+R_{xx}(\Delta t+Ts/2)]/2 \quad (17)$$

where Δt is an error of a sampling timing from initial condition.

According to the current embodiment, the correlation matrix is completely independent from Δt.

Figure 33:
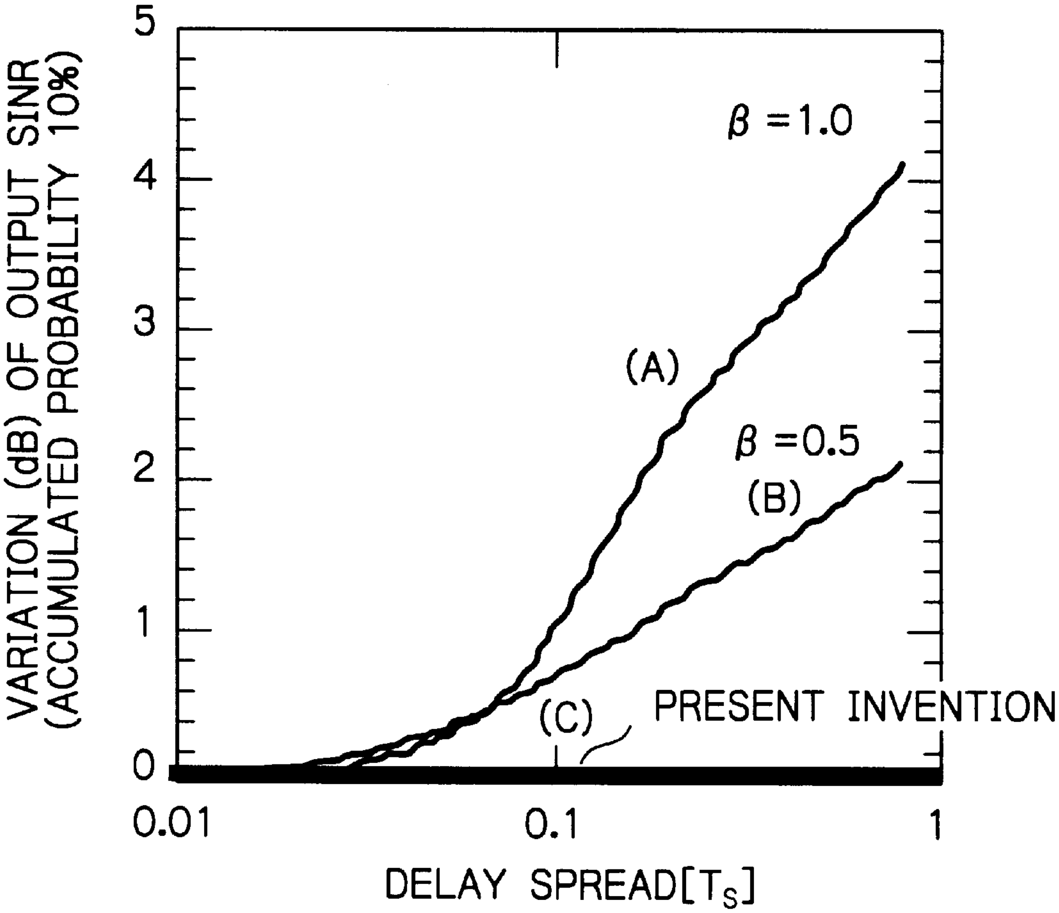
FIG. 33 shows the effect of the present invention.
Figure 34:
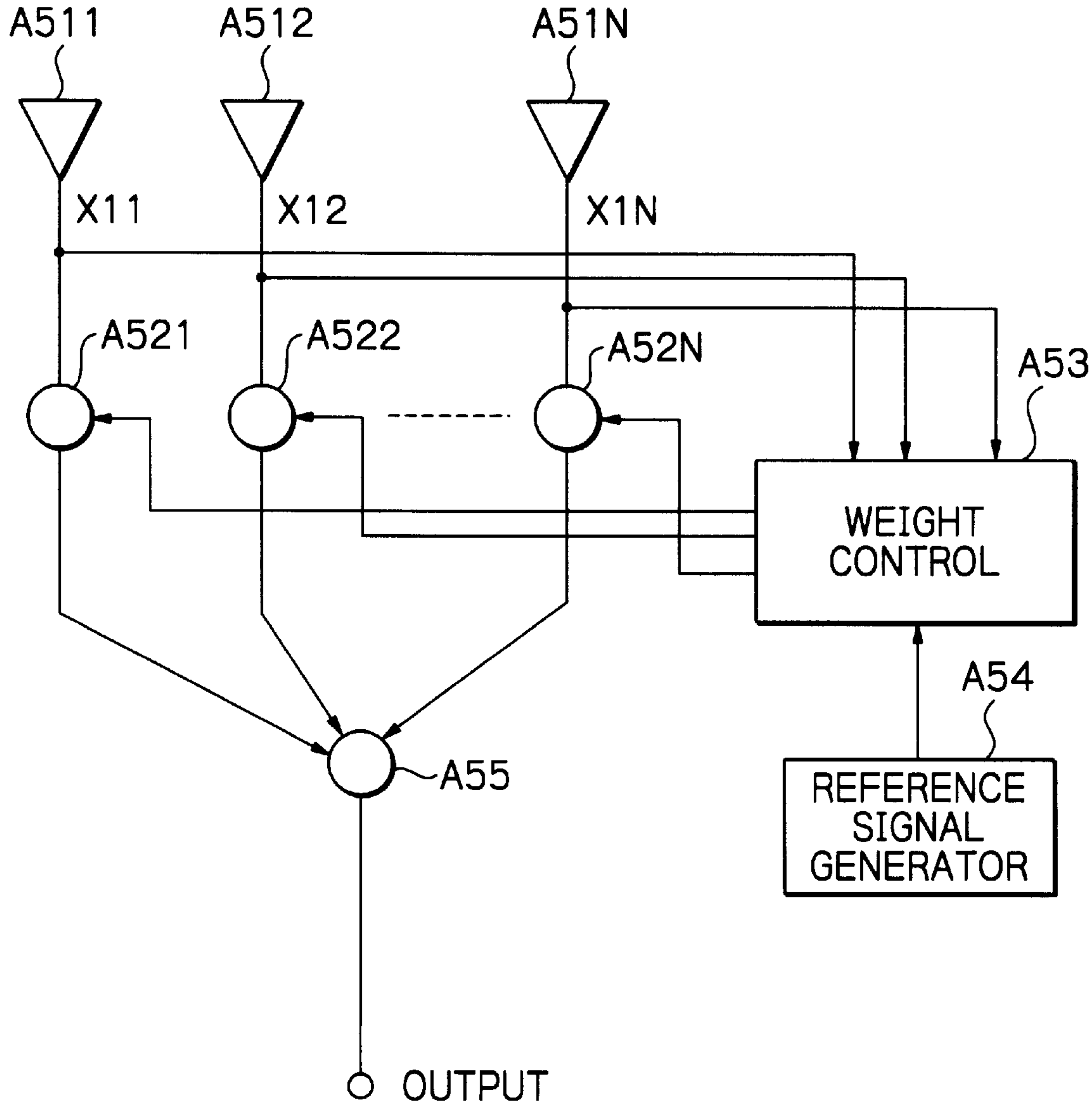
Fig. 34 PRIOR ART
FIG. 34 is a prior adaptive array antenna system.
Figure 35:
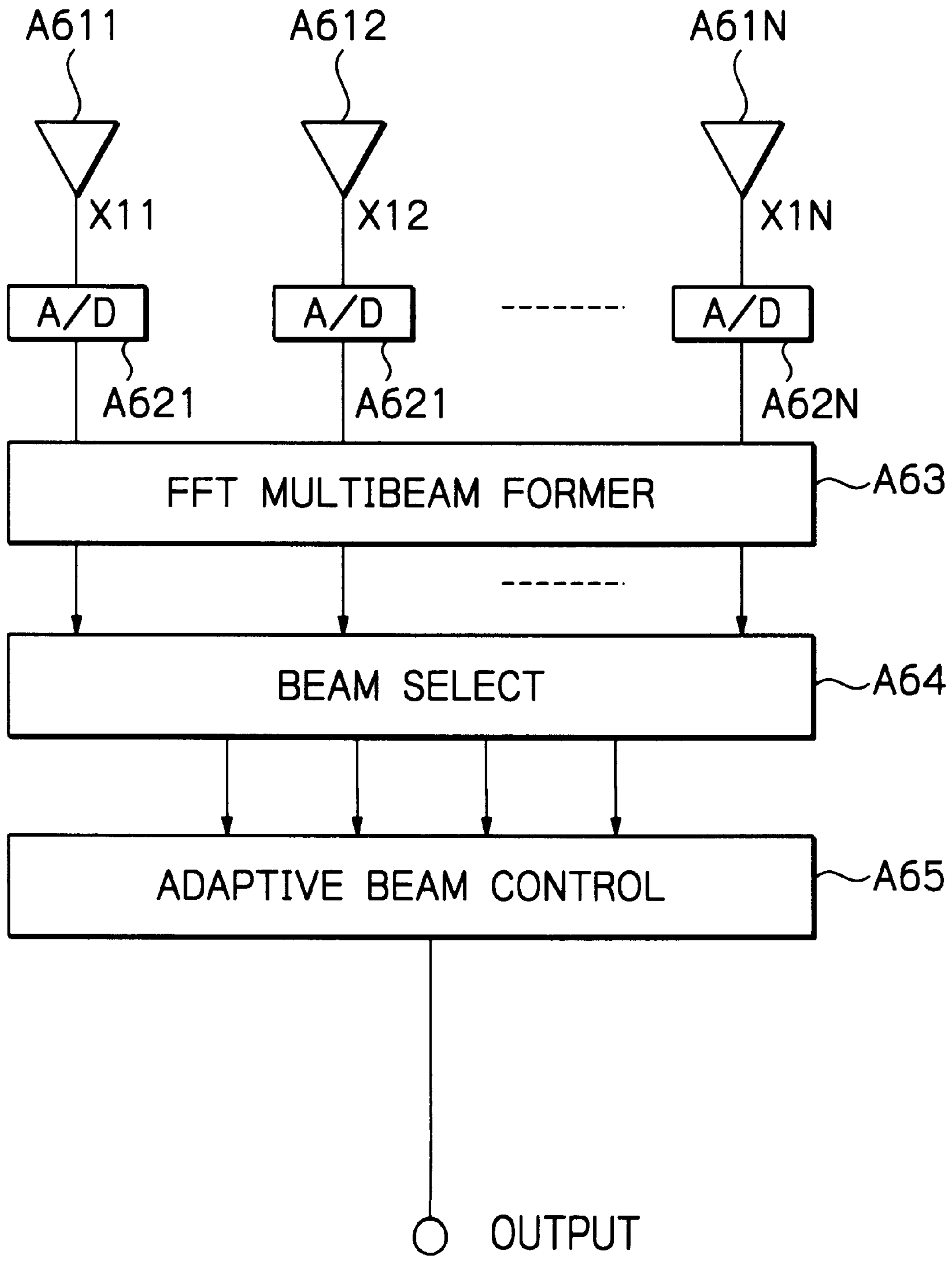
Fig. 35 PRIOR ART
FIG. 35 is a prior adaptive array antenna system with FFT calculation for pre-beam forming.
Figure 36:
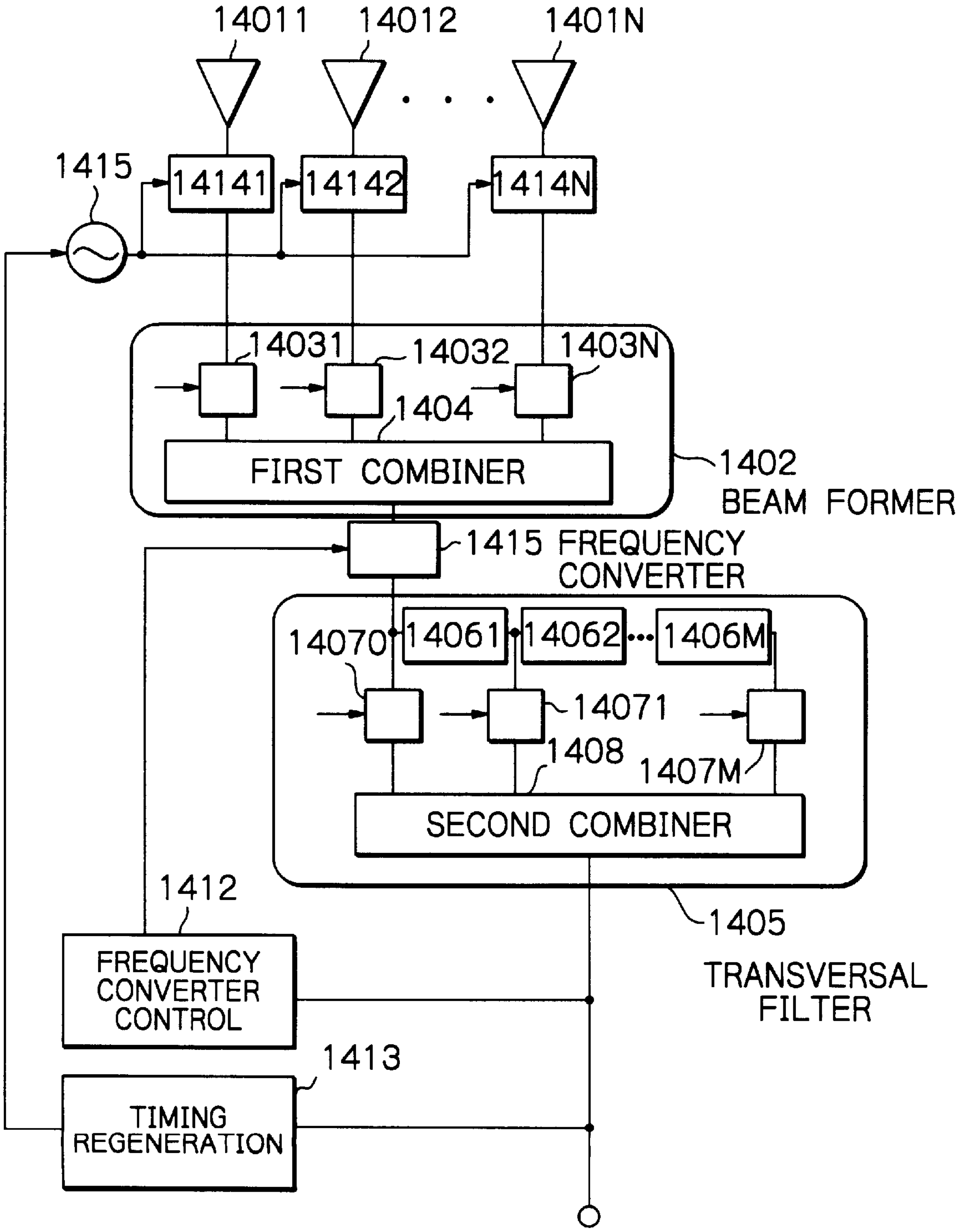
Fig. 36 PRIOR ART
FIG. 36 is a prior adaptive array antenna system with a transversal filter.
Figure 37:
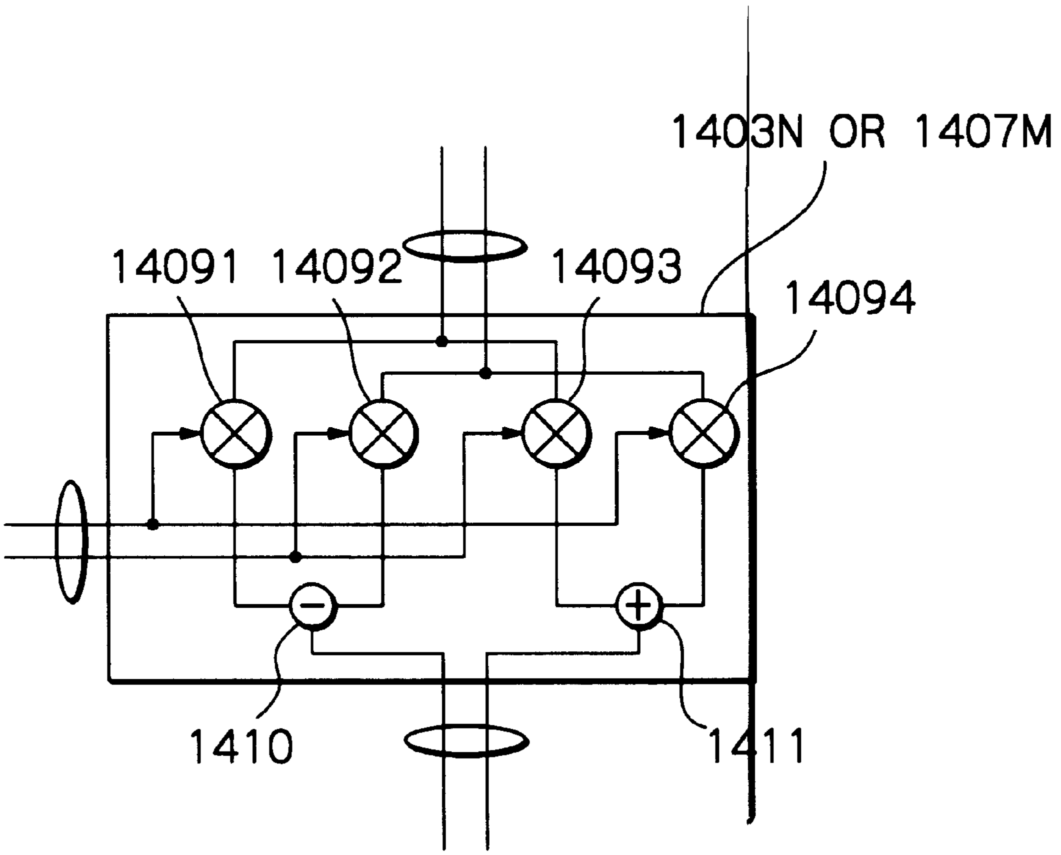
Fig. 37 PRIOR ART
FIG. 37 is a first weight means 14031 through 1403N and a second weight means 14070 through 1407N in FIG. 36.

FIG. 33 shows calculated result between variation of output SINR and delay spread due to sampling timing error, assuming a receive multipath is exponential model, where a number of antenna elements is 8, phase and direction of a receive signal are uniform, and an output SINR is evaluated by 10% value of accumulative probability. The parameter (B) is role off factor. As noted in the figure, as delay spread is large, sampling timing affects much (curves (A) and (B)). On the other hand, according to the present invention (curve (C)), no change occurs by sampling timing, and therefore, stable transmission quality is obtained.

Figure 32:
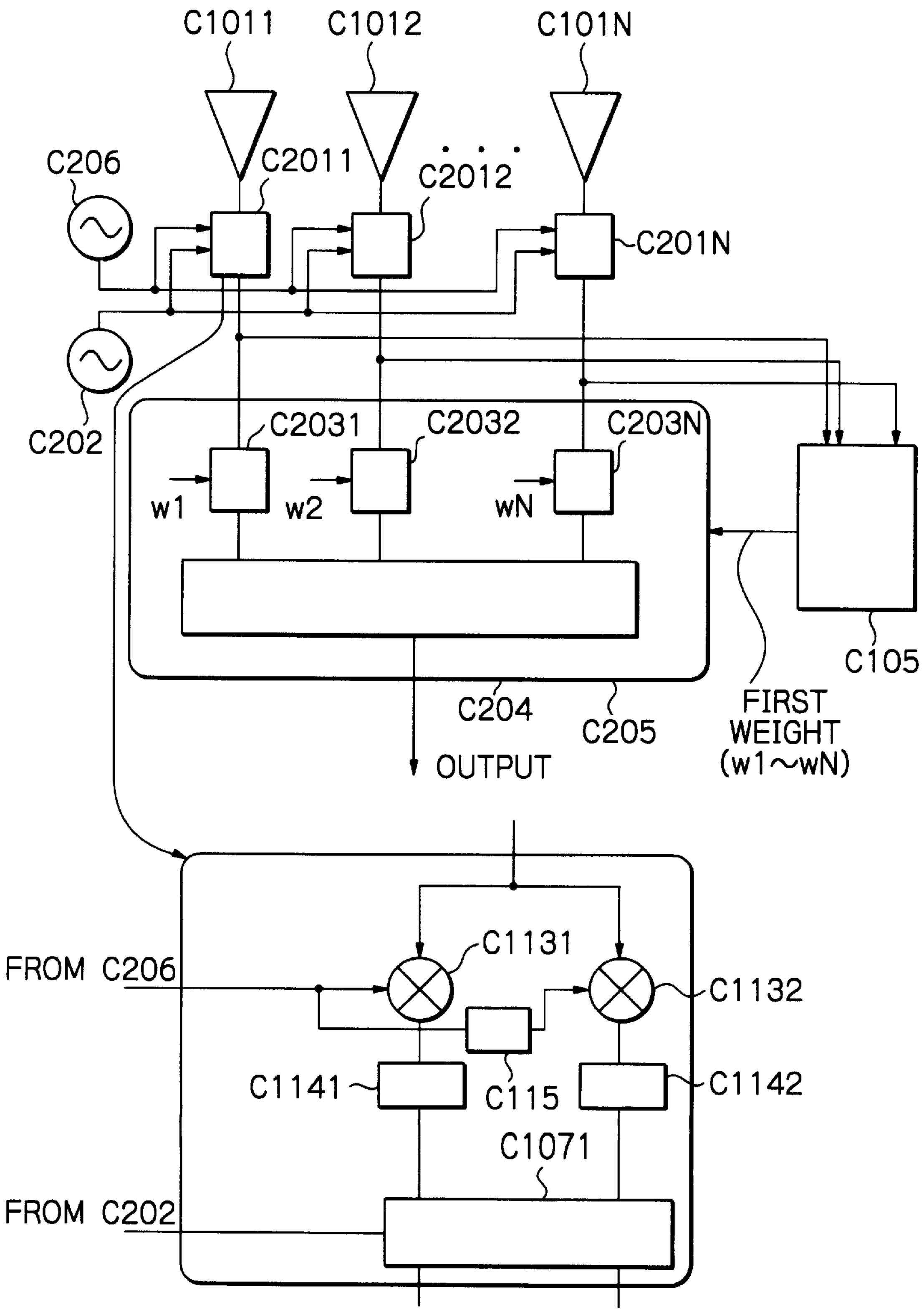
FIG. 32 is still another embodiment of the present invention.

Still another embodiment of the present invention is shown in FIG. 32, in which a beam former is a digital beam former (C205), and an eigen vector beam is formed by using sampling clock asynchronous to a transmission rate.

In the figure, the symbols C2011 through C201N are second quasi coherent detectors, C202 is a sampling clock generator, C2031 through C203N are digital weight means, C204 is a digital adder, C205 is a digital beam former. Each of the second quasi coherent detectors divides a receive signal at each antenna elements into an inphase component and a quadrature component, by using a common oscillator C206. The divided inphase component and quadrature component are converted into digital form by first A/D converters C1071 through C107N, and then, applied to the digital beam former C205 and the first weight control C105. The sampling clock at this time is approximately twice as high as that of transmission rate.

As the correlation matrix $R_{xx}$ formed in the weight control is free from carrier synchronization, since quasi coherent detection is carried out by using the common oscillator C206. Further, it is possible to obtain a correlation matrix which is independent from timing synchronization by using the mean value of $R_{xx}$ defined by the equation (16), as described previously.

The signal applied to the digital beam former C205 is weighted by digital weight means implemented by a digital multiplier, and an output signal y of the same is;

$$y=w1x1+w2x2+ - - - +wNxN$$

The current structure uses a digital beam former, and forms an eigen vector by using a sampling clock which is asynchronous to transmission rate.

Effect of the Invention

The present adaptive array antenna system take an eigen vector beam as an initial value for providing fair transmission quality before synchronization is established, and when synchronization is established, directivity control is carried out under minimum mean square error method (MMSE). Therefore, an adaptive array antenna system operates stably even under very poor transmission quality.

Further, according to the preferred aspects of the present invention, sampling clock for converting a receive signal into digital form is asynchronous to a receive signal, and timing compensation is carried out by a transversal filter which has real weights. Therefore, amount of hardware is decreased, and feedback to sampling clock is avoided. Thus, even under poor transmission quality, an adaptive array antenna operates stably.

From the foregoing, it will now be apparent that a new and improved adaptive array antenna system has been found. It should be understood of course that the embodiments disclosed are merely illustrative and are not intended to limit the scope of the invention. Reference should be made to the appended claims, therefore, for indicating the scope of the invention.

What is claimed is:

1. An adaptive array antenna system comprising;

a plurality of antenna elements, a weight combiner coupled with said antenna elements for providing weight to signals of said antenna elements, and combining weighted signals, a weight control coupled with said antenna elements for calculating weights for said weight combiner, an automatic frequency control accepting an output of said weight combiner, a fractionally spaced adaptive transversal filter for accepting an output of said automatic frequency control, a synchronization monitor accepting an output of said automatic frequency control and weights of said transversal filter, said weight control comprises;

an eigen vector beam forming means for obtaining correlation matrix among said antenna elements and providing weights of eigen vector relating to the maximum eigen values of said correlation matrix, a minimum mean square error means for providing weights so that a square error between output of said weight control and a desired signal is the minimum, and a switch for selecting one of said eigen vector beam forming means and said minimum mean square error means, wherein;

weights in said weight combiner for said antenna elements are initially determined by said eigen vector beam forming means so that eigen vector beam is formed, and then, determined by said minimum mean square error means after said synchronization monitor recognizes that automatic frequency control and said adaptive transversal filter have converged.

2. An adaptive array antenna system according to claim 1, wherein a divider coupled with a respective antenna element is provided for dividing a signal of said antenna element to said weight combiner and said weight control.

3. An adaptive array antenna system comprising;

a plurality of antenna elements, an analog beam former coupled with said antenna elements for weighting signals of said antenna elements with first weight means, a first A/D converter coupled with an output of said analog beam former for converting said output signal into digital form, a first frequency converter for converting an output signal of said A/D converter to a baseband signal, a first fractionally spaced transversal filter coupled with an output of said first frequency converter, and having a plurality of series connected delay elements each having fractional symbol delay, second weight means for weighting an output of each delay elements, and a combiner for combining outputs of said weight means, a first weight control for providing weights to said first weight means, said first weight control receiving a receive signal of said antenna elements and/or an output of said first transversal filter, having a second A/D converter for converting a receive signal into digital form, and a first digital signal processor coupled with an output of said second A/D converter and providing weights to said first weight means, a second weight control receiving an output of said first frequency converter and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, a second sampling clock generator for generating sampling clock of said second A/D converter, said first sampling clock being higher than twice of frequency of transmission rate of receive signal, being asynchronous to said receive signal, and having essentially the same period as delay time of each delay elements of said first transversal filter, and said second sampling clock being asynchronous to said first sampling clock.

4. An adaptive array antenna system according to claim 3, wherein said first weight control comprises a second frequency converter, which converts a receive signal of said antenna elements to IF frequency.

5. An adaptive array antenna system according to claim 3, comprising a second frequency converter for converting a receive signal to IF frequency or a third frequency converter for converting a receive signal to baseband signal, and said IF frequency or said baseband signal thus converted being applied to said first weight control.

6. An adaptive array antenna system comprising;

a plurality of antenna elements, an analog beam former coupled with said antenna elements for weighting signals of said antenna elements with first weight means, a first frequency converter coupled with an output of said analog beam former for converting said output signal into baseband signal, a first A/D converter for converting an output signal of said frequency converter into digital form, a first fractionaly spaced transversal filter coupled with an output of said first frequency converter, and having a plurality of series connected delay elements each having fractional symbol delay, second weight means for weighting an output of each delay elements, and a combiner for combining outputs of said weight means, a first weight control for providing weights to said first weight means, said first weight control receiving a receive signal of said antenna elements and/or an output of said first transversal filter, having a second A/D converter for converting a receive signal into digital form, and a first digital signal processor coupled with an output of said second A/D converter and providing weights to said first weight means, a second weight control receiving an output of said first frequency converter and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, a second sampling clock generator for generating sampling clock of said second A/D converter, said first sampling clock being higher than twice of frequency of transmission rate of receive signal, being asynchronous to said receive signal, and having essentially the same period as delay time of each delay elements of said first transversal filter, and said second sampling clock being asynchronous to said first sampling clock.

7. An adaptive array antenna system comprising;

a plurality of antenna elements, a first A/D converter coupled with said antenna elements for converting a receive signal of said antenna elements into digital form, a digital beam former coupled with output of said first A/D converter for weighting signals with first weight means, a first frequency converter coupled with an output of said digital beam former for converting said output signal into baseband signal, a first frequency converter for converting an output signal of said A/D converter to a baseband signal, a first fractionally spaced transversal filter coupled with an output of said first frequency converter, and having a plurality of series connected delay elements each having fractional symbol delay, second weight means for weighting an output of each delay elements, and a combiner for combining outputs of said weight means, a first weight control for providing weights to said first weight means, said first weight control receiving an output of said first A/D converter and/or an output of said first transversal filter, having a first digital signal processor providing weights to said first weight means, a second weight control receiving an output of said first frequency converter and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, said first sampling clock being higher than twice of frequency of transmission rate of receive signal, being asynchronous to said receive signal, and having essentially the same period as delay time of each delay elements of said first transversal filter.

8. An adaptive array antenna system according to claim 7, comprising a second frequency converter coupled with said antenna elements for converting a receive signal to IF signal, or a third frequency converter for converting said receive signal into baseband signal, so that said IF signal or said baseband signal is applied to said first A/D converter.

9. An adaptive array antenna system comprising;

a plurality of antenna elements, a first frequency converter coupled with said antenna elements for converting a receive signal of said antenna elements to baseband signal, a first A/D converter coupled with an output of said first frequency converter for converting said output into digital form, a digital beam former coupled with an output of said first A/D converter for weighting signals with first weight means and combining weighted signals, a first fractionally spaced transversal filter coupled with an output of said digital beam former, and having a plurality of series connected delay elements each having fractional symbol delay, second weight means for weighting an output of each delay elements, and a combiner for combining outputs of said weight means, a first weight control for providing weights to said first weight means, said first weight control receiving an output of said first A/D converter and/or an output of said first transversal filter, having a first digital signal processor providing weights to said first weight means, a second weight control receiving an output of said digital beam former and providing weights to said second weight means, a frequency converter control receiving an output of said first transversal filter and controlling said first frequency converter so that frequency conversion error in said first frequency converter decreases, a first sampling clock generator for generating sampling clock of said first A/D converter, said first sampling clock being higher than twice of frequency of transmission rate of receive signal, being asynchronous to said receive signal, and having essentially the same period as delay time of each delay elements of said first transversal filter.

10. An adaptive array antenna system according to claim 9, wherein said second weight control comprises an environment measure to determine whether transmission path is under frequency selective fading environment or not, and second weight in said first transversal filter is selected to be real number or complex number depending upon whether transmission path is under frequency selective fading environment or not.

11. An adaptive array antenna system according to one of claims 3, 4, 5, 6, 7, 8, 9, and 10, wherein;

said receive signal is modulated with modulation system which provides discrete amplitude at decision point of each symbol, said second weight control comprises;

a memory storing a set of optimum second weights which relate to error between sample timing in said first A/D converter and optimum timing for decoding, a transmission quality estimate for estimating an error of an output of said first transversal filter from said discrete amplitude when sampled with said second weights stored in said memory, and a second weights being selected from content of said memory so that an estimated error by said transmission quality estimate is the minimum.

12. An adaptive array antenna system according to one of claims 3, 4, 7, 8, and 10, wherein said first digital signal processor comprises;

a reference signal generator providing a reference signal (d), a fourth frequency converter for converting a receive signal of said antenna elements with the same characteristics as that of said first frequency converter, a second transversal filter for converting an output of said fourth frequency converter with the same characteristics as that of said first transversal filter, and said first weight $W_{opt}(i)$ (i=1, - - - ,N) is determined with following equations for signal x'(i) (i=1, - - - , N,N is a number of elements) converted by said fourth frequency converter and said second transversal filter;

$$W_{opt}=R'^{-1}_{xx}r_{xd} \qquad (A)$$

where $$R'_{xx}=[x'^{*}x'^{T}] \qquad (B)$$

$$r_{xd}=\begin{pmatrix}\overline{x1\ d^{*}}\\ | \\ | \\ | \\ | \\ | \\ \overline{xn\ d^{*}}\end{pmatrix} \qquad (C)$$

$$x=\begin{pmatrix}x1\\ | \\ | \\ | \\ | \\ | \\ xN\end{pmatrix} W_{opt}=\begin{pmatrix}w1\\ | \\ | \\ | \\ | \\ | \\ wN\end{pmatrix}. \qquad (D)$$

13. An adaptive array antenna system according to one of clams 5, 6, and 9, wherein said first digital signal processor comprises;

a reference signal generator for generating a reference signal d, fourth frequency converter for frequency conversion of a receive signal of antenna elements with the same characteristics as that of said third frequency converter, second transversal filter for conversion of an output of said fourth frequency converter with the same characteristics of said first transversal filter, wherein;

first weight $W_{opt}$ (i) (i=1, - - - ,N) is determined by the following equations for a signal x'(i) converted by said fourth frequency converter and said second transversal filter;

$$W_{opt}=R'^{-1}_{xx}r_{xd} \qquad (A)$$

where $$R'_{xx}=E(x'^{*}x'^{T}) \qquad (B)$$

$$r_{xd}=\begin{pmatrix}\overline{x1\ d^{*}}\\ | \\ | \\ | \\ | \\ | \\ \overline{xn\ d^{*}}\end{pmatrix} \qquad (C)$$

$$x=\begin{pmatrix}x1\\ | \\ | \\ | \\ | \\ | \\ xN\end{pmatrix} W_{opt}=\begin{pmatrix}w1\\ | \\ | \\ | \\ | \\ | \\ wN\end{pmatrix}. \qquad (D)$$

14. An adaptive array antenna system comprising;

a plurality of antenna elements, an analog beam former coupled with said antenna elements for weighting each signals of said antenna elements by using weight means and combining weighted signals, a plurality of first quasi coherent detectors receiving signals of said antenna elements and an output of said analog beam former, and providing two outputs, a number of said first quasi coherent detectors being the same as a number of said antenna elements, a first A/D converter for converting outputs of said quasi coherent detectors into digital form, a digital signal processor receiving an output of said first A/D converter and providing weights in said analog beam former, sampling clock frequency $f_s$ of said first A/D converter being determined to be;

$$f_s=1/((T/2)+m)$$

where symbol rate of transmission signal is 1/T (Hz), and m is an integer larger than 0, said digital signal processor providing;

a first correlation matrix among antenna elements from 2n'th signal (n is an integer) of outputs of said first A/D converter, a second correlation matrix among antenna elements from (2n+1)'th signal, a third correlation matrix which is sum of said first correlation matrix and said second correlation matrix, and an element of an eigen vector for the maximum eigen value of said third correlation matrix among antenna elements being determined as a weight of said weight means.

15. An adaptive array antenna system comprising;

a plurality of antenna elements, a plurality of second quasi coherent detectors for quasi coherent detection of receive signals of antenna elements, and providing two outputs, a number of said second quasi coherent detectors being the same as a number of antenna elements, fourth A/D converter coupled with said fourth quasi coherent detectors for converting a receive signal of said antenna elements into digital form, a digital beam former for weighting digital signals of an output of said fourth A/D converter by using weight means, and combining weighted signals, a digital signal processor receiving an output of said fourth A/D converter and providing weight of said weight means, sampling clock frequency $f_s$ of said fourth A/D converter being;

$$f_s=1/(T/2)$$

where symbol rate of transmission signal is 1/T (Hz)

said digital signal processor providing;

first correlation matrix among antenna elements from 2n'th signal (n is an integer) of an output of said fourth A/D converter, second correlation matrix among antenna elements from (2n+1)'th signal, third correlation matrix which is sum of said first correlation matrix and said second correlation matrix, an element of an eigen vector for the maximum eigen value of said third correlation matrix being determined as weight of said weight means.

* * * * *